United States Patent
Chan

(10) Patent No.: US 11,330,936 B2
(45) Date of Patent: May 17, 2022

(54) COVERING MEMBER FOR AN OPENING OF A COOKING CAVITY OF A MINI-OVEN

(71) Applicant: SEB ASIA LIMITED, Tai Kok Tsui Kowloon (HK)

(72) Inventor: Chi Wah Chan, Tai Kok Tsui (HK)

(73) Assignee: SEB Asia Limited, Hong Kong (HK)

( * ) Notice: Subject to any disclaimer, the term of this patent is extended or adjusted under 35 U.S.C. 154(b) by 171 days.

(21) Appl. No.: 16/117,776

(22) Filed: Aug. 30, 2018

(65) Prior Publication Data
US 2019/0059648 A1 Feb. 28, 2019

(30) Foreign Application Priority Data

Aug. 31, 2017 (FR) ...................................... 1758062
Mar. 28, 2018 (FR) ...................................... 1852708

(51) Int. Cl.
*F24C 15/00* (2006.01)
*F24C 15/22* (2006.01)
(Continued)

(52) U.S. Cl.
CPC ......... *A47J 37/0664* (2013.01); *F24C 15/007* (2013.01); *F24C 15/02* (2013.01);
(Continued)

(58) Field of Classification Search
CPC ...... F24C 15/325; F24C 14/00; F24C 15/007; F24C 15/36; F24C 15/001; F24C 15/02; F24C 15/08; F24C 15/16; F24C 15/2042; F24C 15/32; F24C 3/008; F24C 7/085; A21B 1/52; A47J 27/13; A47J 37/0623; A47J 37/0629; A47J 37/0664; A47J 37/08; A47J 37/0814
(Continued)

(56) References Cited

U.S. PATENT DOCUMENTS

| | | | | |
|---|---|---|---|---|
| 3,132,638 A | * | 5/1964 | Habe | ...................... F24C 15/36 |
| | | | | 126/19 R |
| 3,318,299 A | * | 5/1967 | Lewis | ..................... F24C 14/00 |
| | | | | 126/19 R |
| 5,928,540 A | * | 7/1999 | Antoine | ................ F24C 15/006 |
| | | | | 219/391 |

FOREIGN PATENT DOCUMENTS

| | | |
|---|---|---|
| JP | 3108321 B2 | 11/2000 |
| KR | 100 887 754 B1 | 3/2009 |
| WO | WO 2008/047397 A2 | 4/2008 |

OTHER PUBLICATIONS

Warner, 23 in. Paint Guide and Wallcovering Tool, Jun. 27, 2017 (Year: 2017).*

(Continued)

*Primary Examiner* — Ibrahime A Abraham
*Assistant Examiner* — Chris Q Liu
(74) *Attorney, Agent, or Firm* — Lerner, David, Littenberg, Krumholz & Mentlik, LLP

(57) ABSTRACT

A covering member intended to be connected to a mini-oven, includes one or more connectors. The covering member is constructed and arranged to form at least a portion of the mini-oven door or to be placed between the cooking cavity and the mini-oven door when the door is closed, so as to limit access to the cooking cavity through the opening of the mini-oven. The covering member may reduce the quantity of heat energy lost from the cooking cavity when the mini-oven door is open, such that it improves the performance of the mini-oven and reduces cooking times.

8 Claims, 30 Drawing Sheets

(51) Int. Cl.
   *F24C 15/02*      (2006.01)
   *A47J 37/06*      (2006.01)
   *F24C 15/28*      (2006.01)
   *F24C 7/06*       (2006.01)

(52) U.S. Cl.
   CPC .............. *F24C 15/22* (2013.01); *F24C 15/28* (2013.01); *F24C 7/06* (2013.01)

(58) Field of Classification Search
   USPC ......... 99/340, 389, 337, 385, 391, 393, 467, 99/474, 386; 126/19 R, 273 R, 19 M, 126/190, 21 A, 337 R, 339; 219/392, 219/400, 405, 413, 438, 450.1, 521
   See application file for complete search history.

(56) References Cited

OTHER PUBLICATIONS

Katom, Equipex TS-327 Countertop Commercial Toaster Oven, Nov. 5, 2015 (Year: 2015).*
Equipex TS-327 Manual (Year: 2015).*
Search Report as issued in French Patent Application No. 1758062, dated May 14, 2018.
European Search Report for EP18186649 completed Jan. 14, 2019; 2 pages.

* cited by examiner

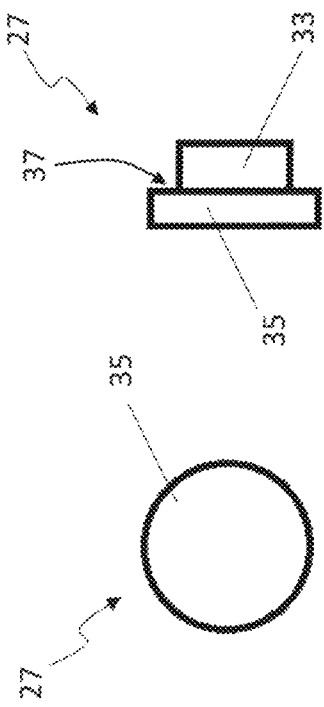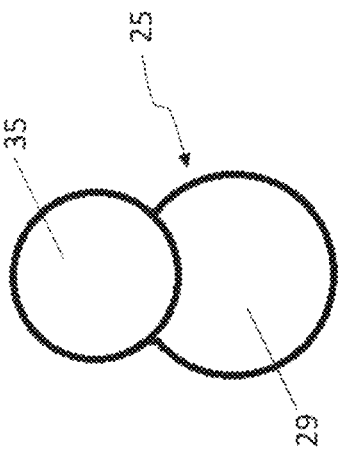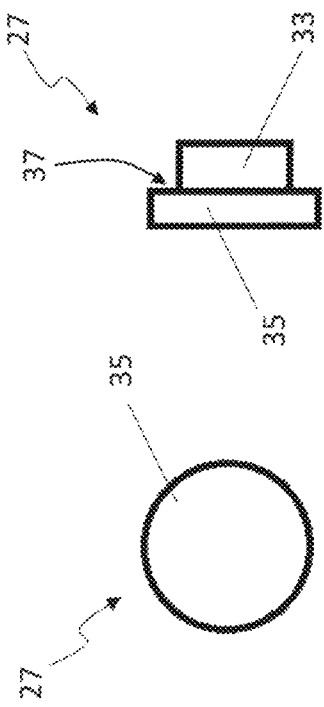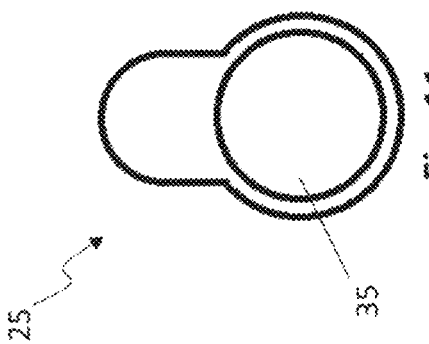

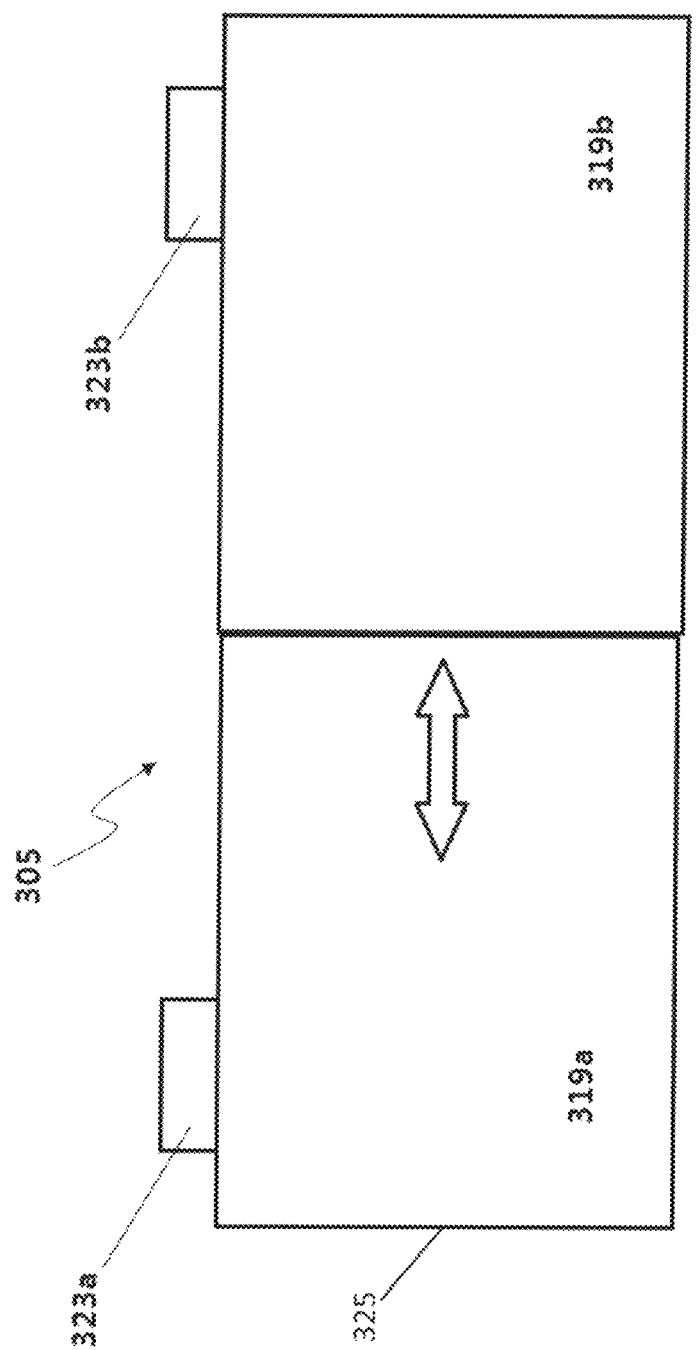

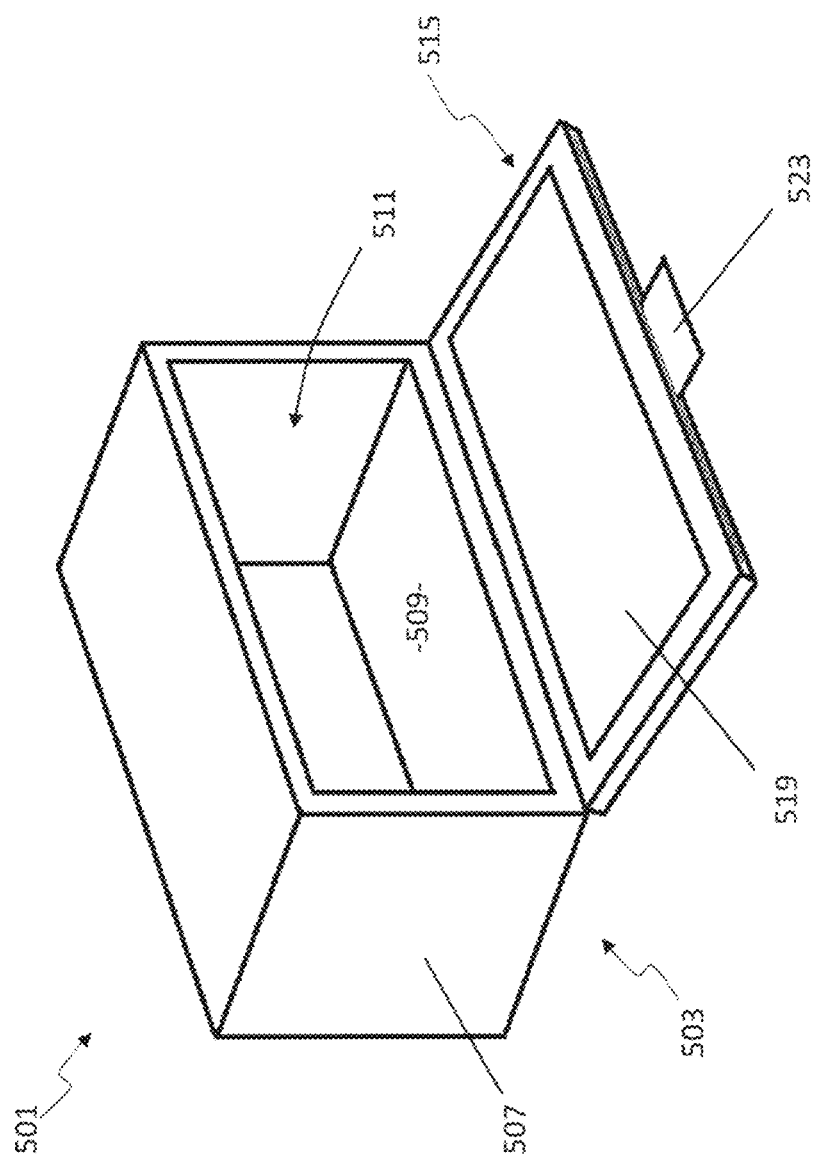

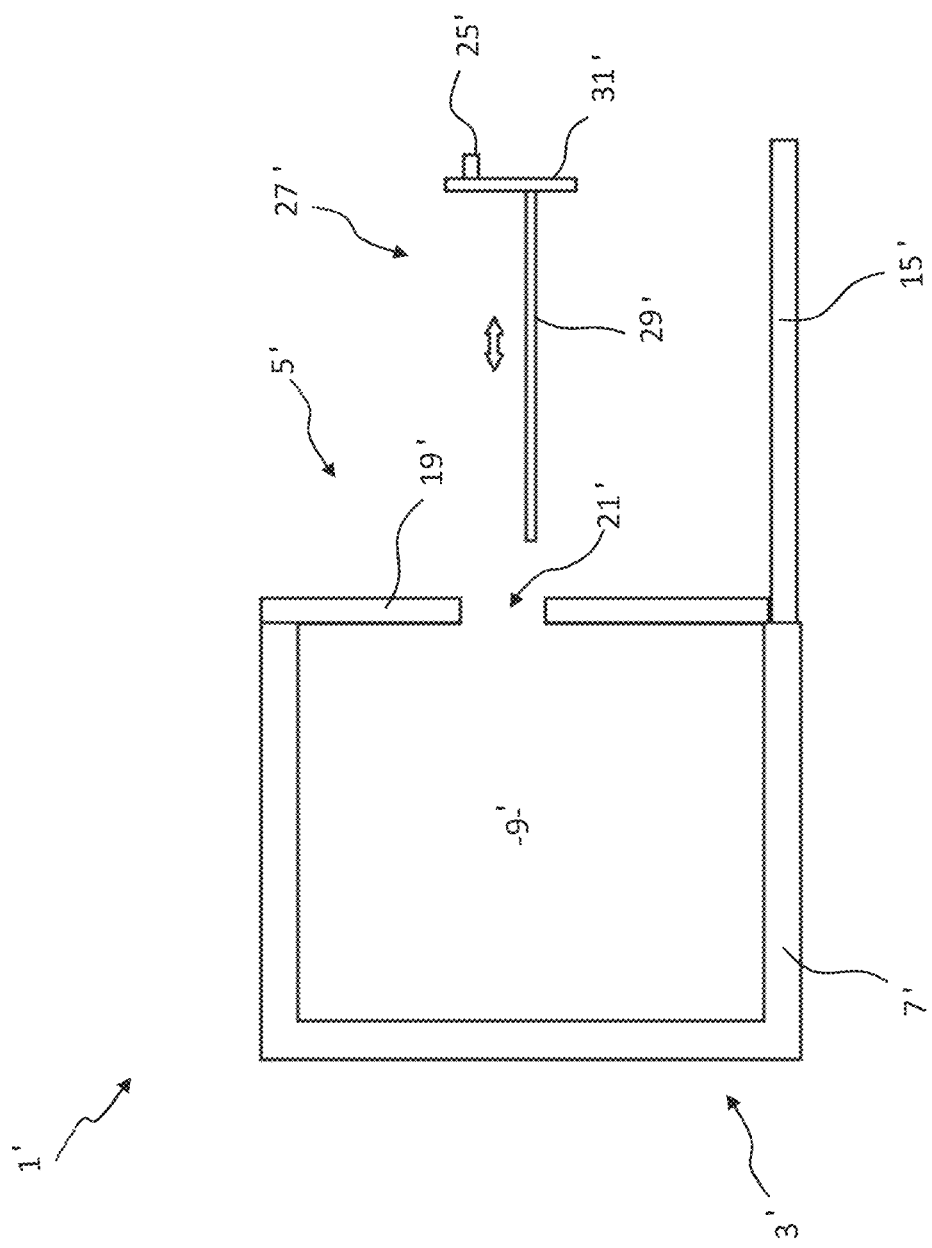

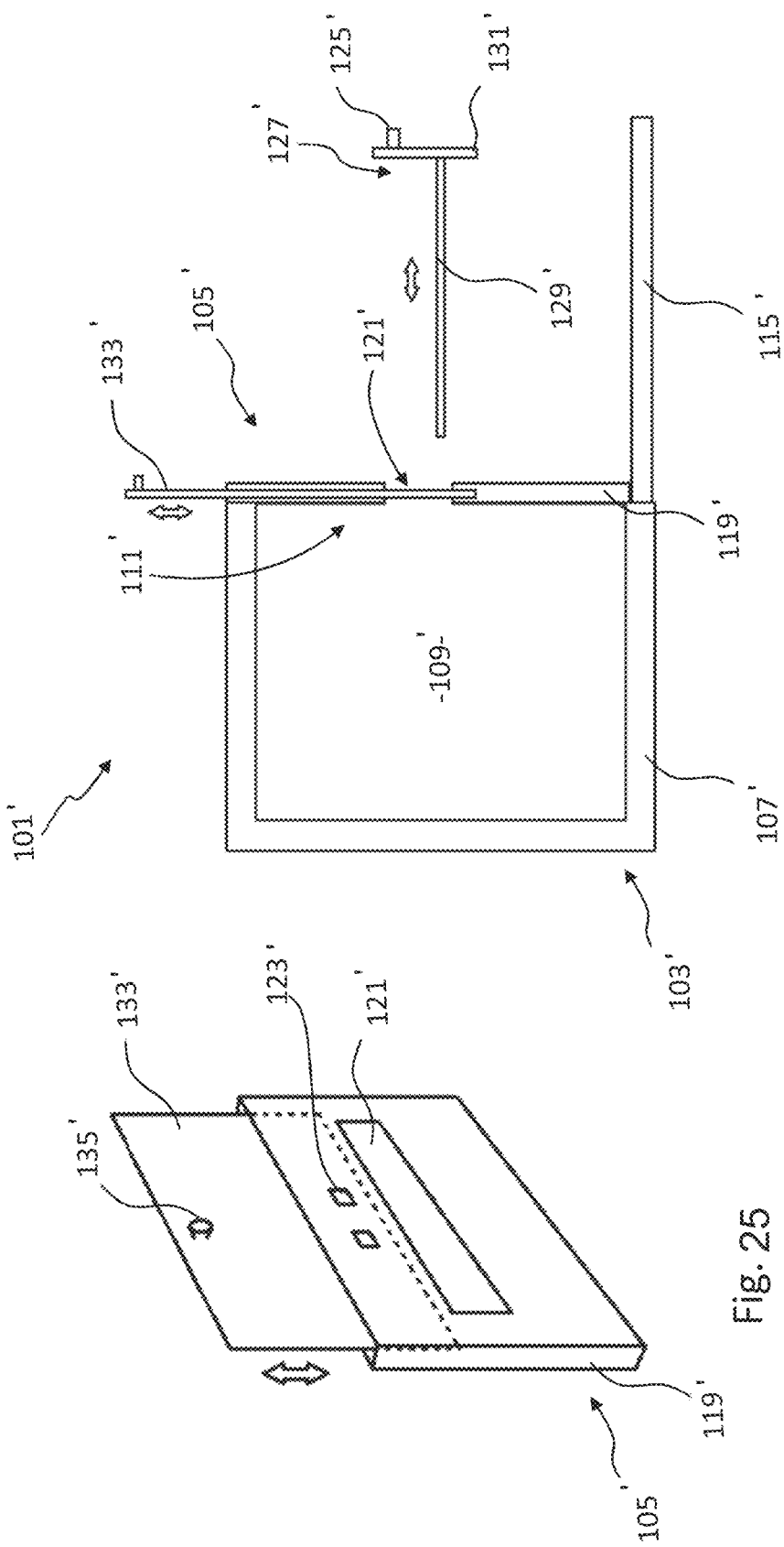

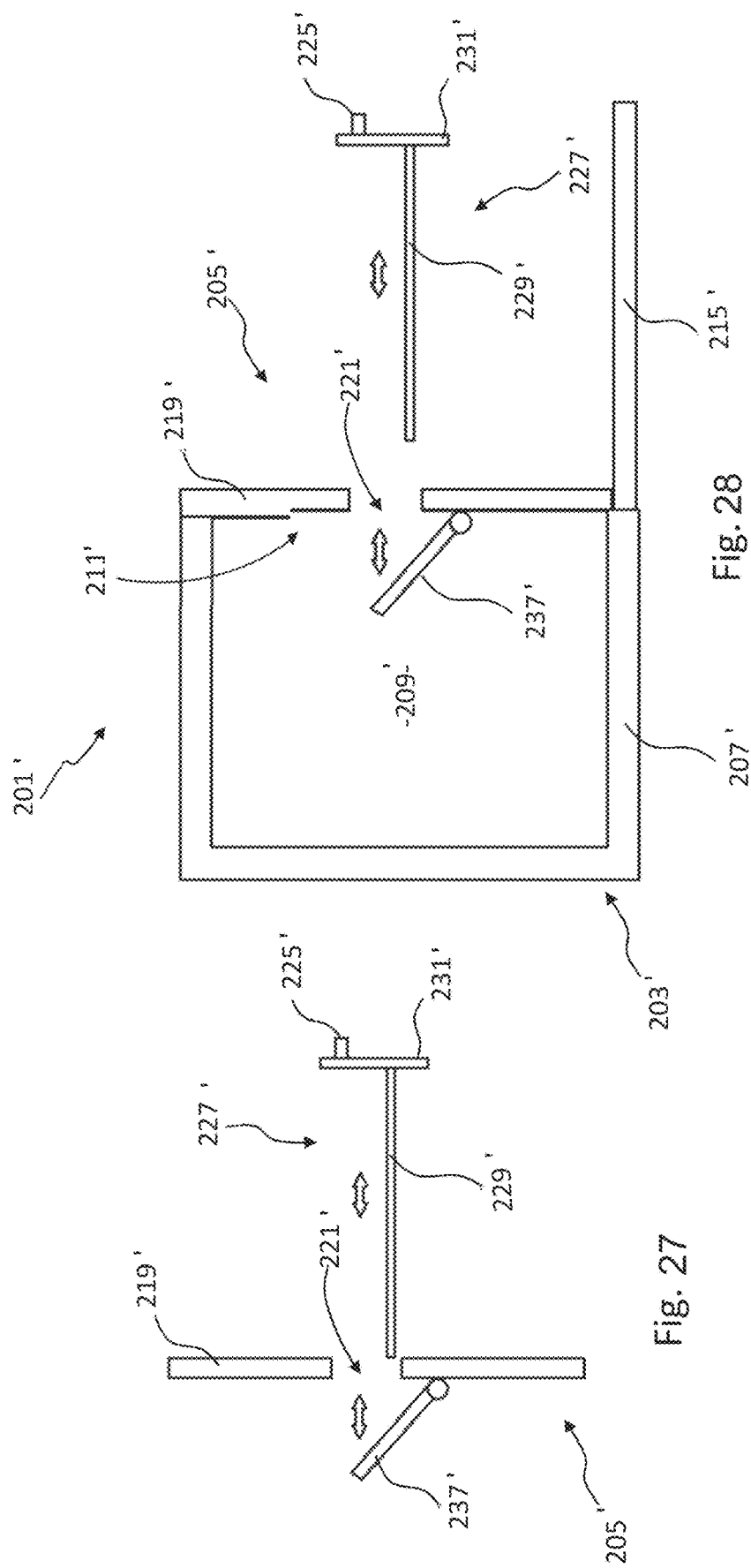

COVERING MEMBER FOR AN OPENING OF A COOKING CAVITY OF A MINI-OVEN

CROSS-REFERENCE TO RELATED APPLICATIONS

This application claims priority to French Application No. 1758062 filed on Aug. 31, 2017 and French Application No. 1852708 filed on Mar. 28, 2018, the contents of which are incorporated herein by reference in their entirety.

FIELD

This invention concerns a covering member for an opening of a cooking cavity of a mini-oven.

BACKGROUND

Ovens comprise a thermally insulated cavity or chamber and a door that can be manipulated between an open position, in which it is possible to access the cavity so that food products can be placed in it, and a closed position, in which the cavity is essentially insulated from the external environment and the oven can be implemented to cook the foods. There are many types of ovens, in particular large household ovens, toaster ovens or mini-ovens.

Mini-ovens, in particular, are popular in homes with small kitchens where space is limited. Mini-ovens comprise an essentially metallic frame which defines a thermally insulated cooking cavity and a door allowing access to the cooking cavity so that foods can be transferred between the cooking cavity and the outside of the mini-oven. The cooking cavity comprises at least one electric heating element or a filament which generates heat energy during passage of electric current in order to cook foods in the cooking cavity. One or more racks may be included in the cooking cavity in order to support foods at various heights inside the cooking cavity, so that various cooking operations, such as roasting, broiling or general oven cooking, can be performed.

Although the size of mini-ovens varies, they are generally designed to hold small foods such as bread slices, bagels, vegetables, pizza, cookies and cupcakes. However, for some larger mini-ovens, the cooking cavity can hold larger foods such as chickens and roasts.

As with most ovens, the cooking process involves preheating the cooking cavity to a desired or target temperature at which the foods can be cooked optimally. Once the target temperature is reached, the oven door is opened and the foods are inserted into the cooking cavity and enclosed by the oven door. The oven keeps the cooking cavity at the target temperature for a predetermined period, so that the foods can be cooked in a precise and predictable manner.

One problem associated with ovens is that, when the oven door is open, heat energy is lost by dissipation towards the outside of the oven through the opening of the cooking cavity. The oven must therefore do more work to return the cooking cavity to the target temperature and, as a result, the foods take longer to cook. When the foods to be cooked have a cross section much smaller than the opening of the cooking cavity, the heat energy loss during opening of the oven door is unnecessary, inefficient and a source of waste.

SUMMARY

One aspect of this invention is to propose a more energy-efficient mini-oven with reduced cooking times.

A first aspect of this invention concerns a covering member intended to be connected to a mini-oven, the mini-oven comprising a cooking cavity accessible from the outside of the mini-oven through an opening, it being possible to close the opening with a door that can be moved between a first position, in which it is possible to access the cooking cavity from the outside of the oven through the opening, and a second position, in which the door restricts access to the cooking cavity from the outside of the oven through the opening, the covering member comprising one or more connectors constructed and arranged to connect the covering member to one or more complementary connectors of the mini-oven, and the covering member being sized and designed to be able to be slidably connected to the mini-oven and to form at least a portion of the door when it is connected to the mini-oven, or the covering member being sized and designed such that at least a portion of the covering member can be placed between the cooking cavity and the door when the door is in the second position, and the covering member also being sized and designed so as to limit access to the cooking cavity through the opening when it is connected to the mini-oven.

Limiting access to the cooking cavity through the opening is beneficial in that this reduces the exposure of the cooking cavity to the outside of the mini-oven through the opening when the mini-oven door is in the first, open, position. Therefore, an unnecessary heat energy loss from the cooking cavity towards the outside of the mini-oven is reduced when the oven door is open but it is still possible to transfer certain small foods between the cooking cavity and the outside of the mini-oven. Reducing the heat energy loss from the cooking cavity during transfer of one or more foods between the outside of the oven and the cooking cavity makes it possible to maintain or quickly reestablish the desired cooking temperature of the cooking cavity, thereby reducing cooking times. The covering member also helps to further reduce heat energy loss from the cooking cavity to the outside of the mini-oven when it is positioned between the cooking cavity and the door in the second, closed, position such that the mini-oven cooking cavity can reach a desired temperature more quickly and efficiently than in the absence of the covering member.

One or more connectors may be positioned for connecting the covering member to the mini-oven such that, during connection to the mini-oven, the covering member extends across an upper region of the opening. One or more connectors may be positioned for connecting the covering member to an upper part of the mini-oven.

At least one connector may comprise a part of the covering member designed so as to cooperate with a part of the mini-oven having a complementary shape. At least one connector may comprise an edge of the covering member designed so as to cooperate with a throat, a slot or a groove of the mini-oven.

At least one connector may comprise a keyhole-shaped opening intended to receive a projection having a complementary shape extending from the mini-oven. The opening may be positioned on the covering member so as to allow a part of the mini-oven to extend across the opening when the covering member is connected to the mini-oven and the door is in the second position.

The covering member may also be sized and designed such that, when the covering member is connected to the mini-oven, it allows at least a portion of a rack or of a drip pan to be transferred between the cooking cavity and the outside of the oven through the opening.

At least a portion of the covering member may comprise a sheet of material. The sheet of material may be thin enough to be lodged between the door and the cooking cavity when the door is in the second position.

The covering member may also comprise a handle allowing the covering member to be gripped and manipulated. At least a portion of the handle may be positioned such that, when the covering member is connected to the mini-oven and arranged between the cooking cavity and the door, when the door is in the second position, at least a portion of the handle is outside of the mini-oven.

The dimensions or the form of the covering member may be adjustable.

A second aspect of this invention concerns a mini-oven comprising a cooking cavity accessible from the outside of the oven through an opening, a door that can be moved between a first position, in which it is possible to access the cooking cavity from the outside of the oven through the opening, and a second position, in which the door restricts access to the cooking cavity from the outside of the oven through the opening, and one or more connectors constructed and arranged to interact with complementary connectors of a covering member according to the first aspect of this invention.

At least one connector of the mini-oven may comprise a projection extending from a part of the mini-oven and intended to receive a complementary keyhole-shaped opening of the projection and situated on the covering member.

At least one connector of the mini-oven may comprise a groove, a slot or a throat intended to receive a complementary edge of the covering member.

At least one connector of the mini-oven may be removable.

A third aspect of this invention concerns an assembly forming a mini-oven comprising a mini-oven according to the second aspect of this invention, and a covering member according to the first aspect of this invention.

One or more connectors of the covering member and one or more complementary connectors of the mini-oven may be positioned such that the covering member extends across an upper region of the opening of the mini-oven.

One or more connectors of the covering member and one or more complementary connectors of the mini-oven may be positioned such that the covering member is connected to an upper part of the mini-oven.

At least one connector may comprise a keyhole-shaped opening intended to receive a projection having a complementary shape extending from the mini-oven.

The opening may be positioned on the covering member such that a part of the mini-oven extends across the opening when the covering member is connected to the mini-oven and the door is in the second position.

At least one connector of the covering member may comprise an edge of the covering member and at least one connector of the mini-oven may comprise a complementary groove or throat in which the edge of the covering member is received.

The covering member may also be sized and designed such that it allows at least a portion of a rack or of a drip pan to be transferred between the cooking cavity and the outside of the oven through the opening when the covering member is connected to the mini-oven.

At least a portion of the covering member may comprise a sheet of material that is thin enough to be lodged between the door and the cooking cavity when the door is in the second position.

At least a portion of the handle of the covering member may be positioned outside of the mini-oven when the covering member is connected to the mini-oven and arranged between the cooking cavity and the door is in the second position.

A variant of the invention concerns a cover for an opening of a cooking cavity of a mini-oven, the cover comprising a body and a slot formed through the body, the body being sized and shaped to cover the opening and able to be arranged relative to the cooking cavity such that foods can be transferred between the cooking cavity and the outside of the mini-oven by means of the slot, and the slot being sized and configured such that, when the cover is arranged relative to the cooking cavity such that foods can be transferred between the cooking cavity and the outside of the mini-oven by means of the slot, the cooking cavity is then less exposed to the outside of the mini-oven by means of the slot than by means of the opening without the cover.

Reducing the cooking cavity's exposure to the outside of the mini-oven while still permitting certain food products to be transferred between the cooking cavity and the outside of the mini-oven has the advantage of reducing superfluous heat energy loss from the cooking cavity to the outside of the mini-oven. Reducing the heat energy loss from the cooking cavity to the outside of the mini-oven allows the cooking cavity of the mini-oven to reach a desired temperature more quickly and with better performance. This also reduces a temperature drop in the cooking cavity from the desired temperature due to the heat energy loss during the insertion of one or more food products into the cooking cavity through the slot, thus reducing their cooking times.

The cover may also comprise a sealing member constructed and arranged to seal the slot, the sealing member being able to be moved between a first position in which the slot is open and a second position in which the slot is closed. The sealing member may be fixed to the body by a hinge. The sealing member may be slidably attached to the body such that the sealing member can slide relative to the body between a first position and the second position. The sealing member may be biased towards the second position. The sealing member may be configured to extend inside the cooking cavity of the mini-oven in the second position when the cover is arranged to cover the opening. The sealing member may comprise a food support configured to hold one or more food products and a flange extending from the food support, at least a portion of the food support being sized and shaped for insertion through the slot and the flange being sized and shaped to cover the slot when at least a portion of the food support is inserted through the slot and the flange is against the body. There may be more than one sealing member. The cover may also comprise a gasket between the sealing member and the body to prevent the passage of air between the body and the sealing member when the sealing member is in the second position.

The cover may also comprise a mounting system constructed and arranged to mount the cover on a mini-oven.

The cover may also comprise a removable handle that can be connected to the body and/or to the sealing member to allow the cover and/or the sealing member to be maneuvered by means of the handle. The handle may also be capable of being connected to the sealing member to allow the sealing member to be maneuvered by means of the handle. The handle and the body or the sealing member may each comprise characteristics that cooperate with one another to allow the handle to be fixed to the body or to the food support.

The cross-sectional area of the slot may be smaller than the cross-sectional area of the opening. The cross-sectional area of the slot may be at least 20% smaller than the cross-sectional area of the opening.

The slot may be substantially rectangular in shape and the width of the slot may be greater than the height of the slot.

The slot may be sized and shaped to allow a rack of the mini-oven to move between the cooking cavity and the outside of the mini-oven by means of the slot when the cover is arranged to extend across the opening. The slot may be positioned and oriented in the body such that, when the cover is arranged to cover the opening, one or more system intended to receive a rack of the mini-oven are aligned with the slot such that a rack can be inserted into a system intended to receive a rack from the outside of the mini-oven by means of the slot.

The cover may also comprise one or more windows. The cover may also comprise a reflective surface.

The cover may be sized and shaped to rest, during use, between the cooking cavity and a door of the mini-oven when the door is in the closed position.

The cover may be an accessory of the mini-oven that can be separated from the mini-oven. The cover may be a door of a mini-oven.

A second aspect of the variant of this invention concerns a mini-oven assembly comprising a mini-oven and a cover according to the first aspect.

A third aspect of the variant of this invention concerns a mini-oven comprising a cover according to the first aspect.

BRIEF DESCRIPTION OF THE FIGURES

Embodiments of this invention will be explained in greater detail below as examples and in reference to the attached drawings, in which:

FIG. 9 is an enlarged front view of the keyhole-shaped opening of the covering member illustrated in FIG. 3;

FIG. 10a is an enlarged front view of a projection extending from an upper part of the mini-oven illustrated in FIG. 5;

FIG. 10b is a profile view of the projection illustrated in FIG. 10a;

FIG. 11a is a front view of the keyhole-shaped opening illustrated in FIG. 9 when the projection illustrated in FIGS. 10a and 10b is positioned in a portion of the keyhole-shaped opening;

FIG. 11b is a front view of the keyhole-shaped opening and the projection illustrated in FIG. 11a when the projection is positioned in a different part of the keyhole-shaped opening;

FIG. 14 is a front view of an embodiment variant of a covering member according to an aspect of the invention;

FIG. 16c is a perspective view of the embodiment illustrated in FIG. 16a in another configuration in which it is possible to access the cooking cavity of the mini-oven.

FIG. 22 is a cross-sectional view of the mini-oven and the cover of FIG. 21 with an additional part of the cover separated from the body of the cover, and the mini-oven door being in an open state;

FIG. 25 is a perspective view of a cover according to another embodiment of the variant of the invention;

FIG. 26 is a cross-sectional view of the cover represented in FIG. 25 with an additional part of the cover, and the oven door being in an open state;

FIG. 27 is a cross-sectional view of a cover according to yet another embodiment of the variant of this invention, interacting with an additional part of the cover;

FIG. 28 is a cross-sectional view of the cover represented in FIG. 27, interacting with the additional part of the cover, and the oven door being in an open state;

DETAILED DESCRIPTION

Figure 1:
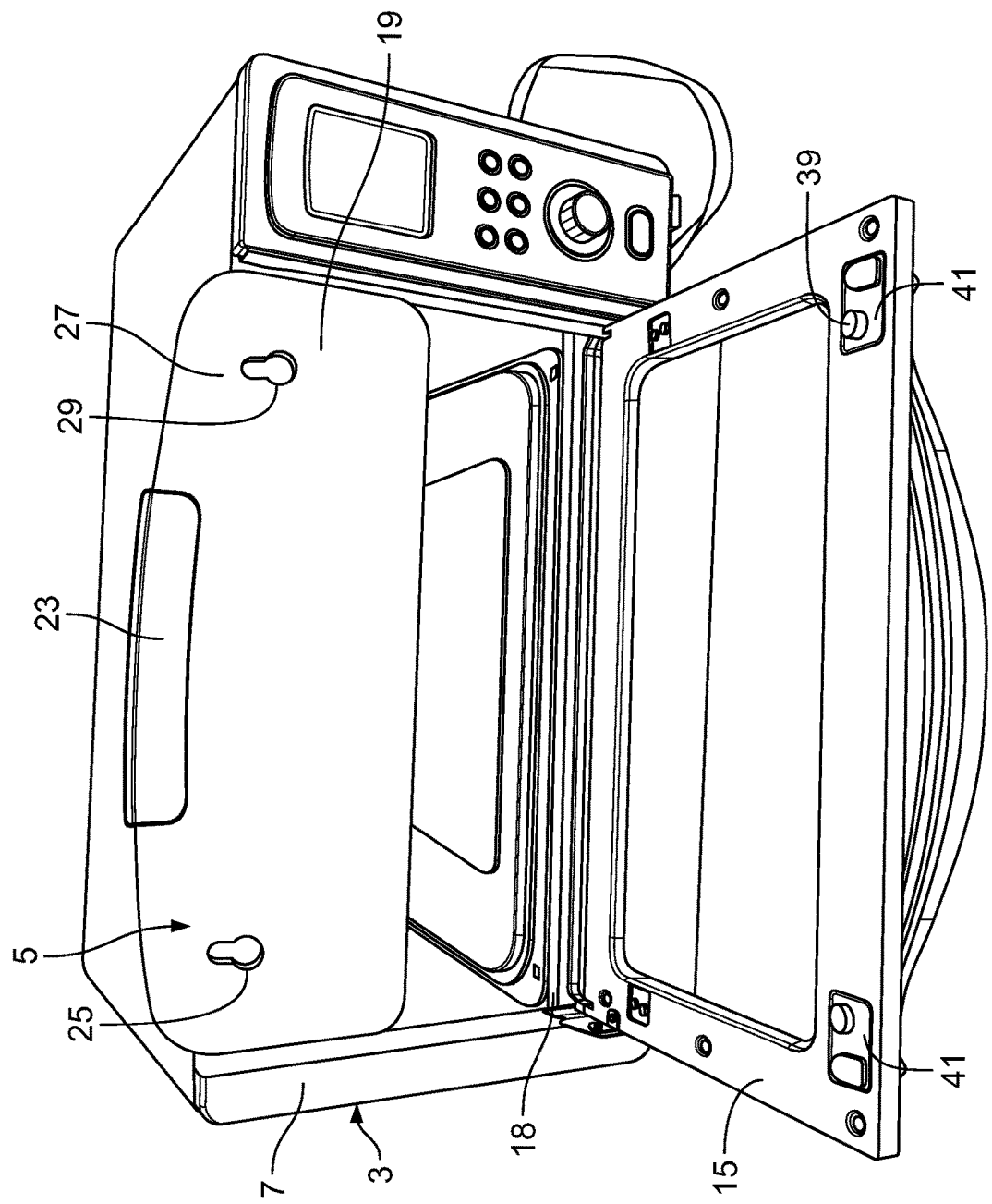
FIG. 1 is a front view of an assembly forming a mini-oven comprising a mini-oven and a covering member according to an aspect of the invention connected to the mini-oven, when the mini-oven door is in an open position.
Figure 2:
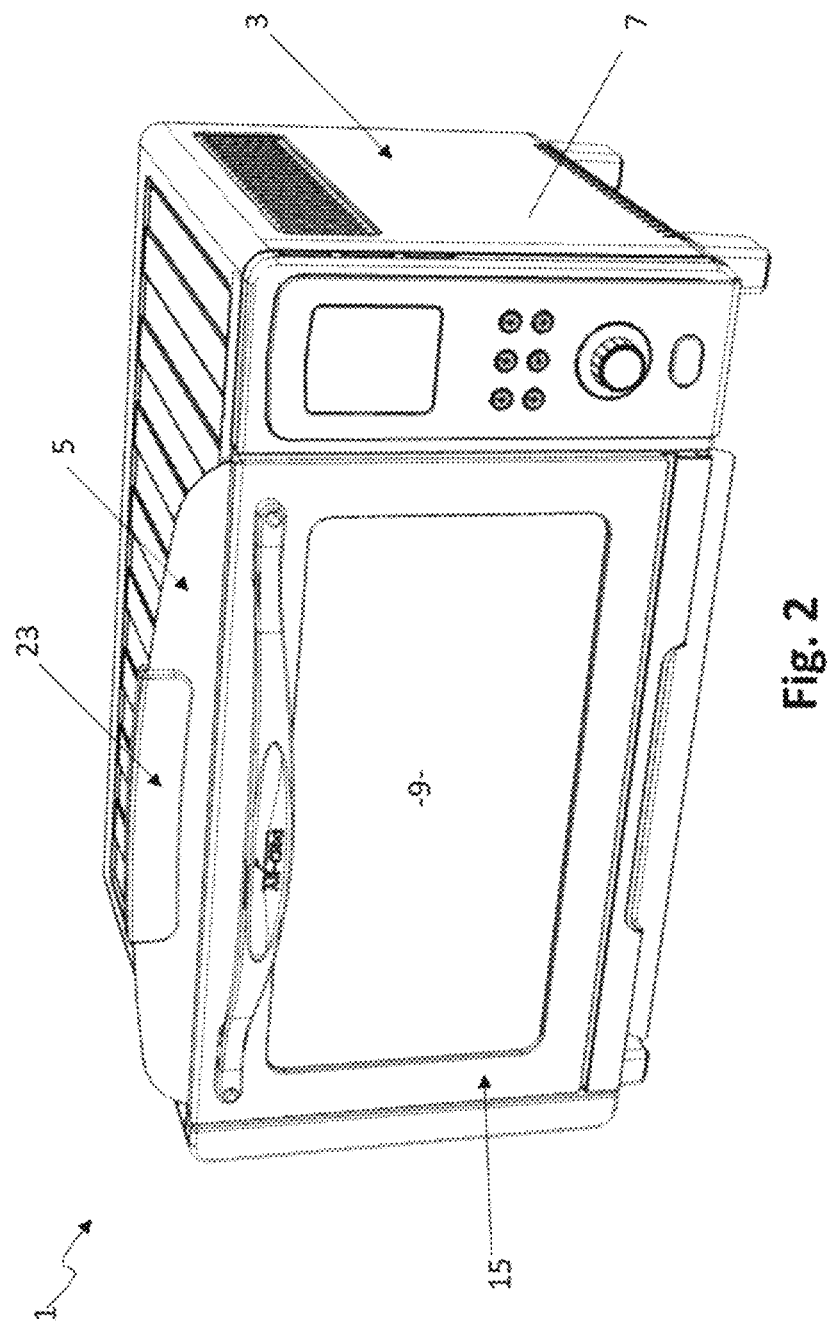
FIG. 2 is a perspective view of the assembly forming a mini-oven illustrated in FIG. 1, when the mini-oven door is in a closed position.

In reference to FIGS. 1 and 2, an assembly forming a mini-oven 1 is illustrated, comprising a mini-oven 3 and a covering member 5 in the form of an accessory connected to the mini-oven 3. The mini-oven 3 comprises a frame 7 which defines a cooking cavity 9 comprising an essentially rectangular opening 11 defined by an edge allowing access to the cooking cavity 9. The mini-oven 3 also comprises a door 15 which is hingedly connected to the frame 7 of the mini-oven and which can be moved between a first position, in which the mini-oven door is in an open state such that it is possible to access the cooking cavity 9 so that a user can transfer foods between the cooking cavity 9 and the outside of the mini-oven (as illustrated in FIG. 1), and a second position, in which the door 15 of the mini-oven is in a closed or essentially closed state and extends across the opening 11 (as illustrated in FIG. 2) such that it is not possible to easily transfer foods between the cooking cavity 9 and the outside of the oven.

Figure 5:
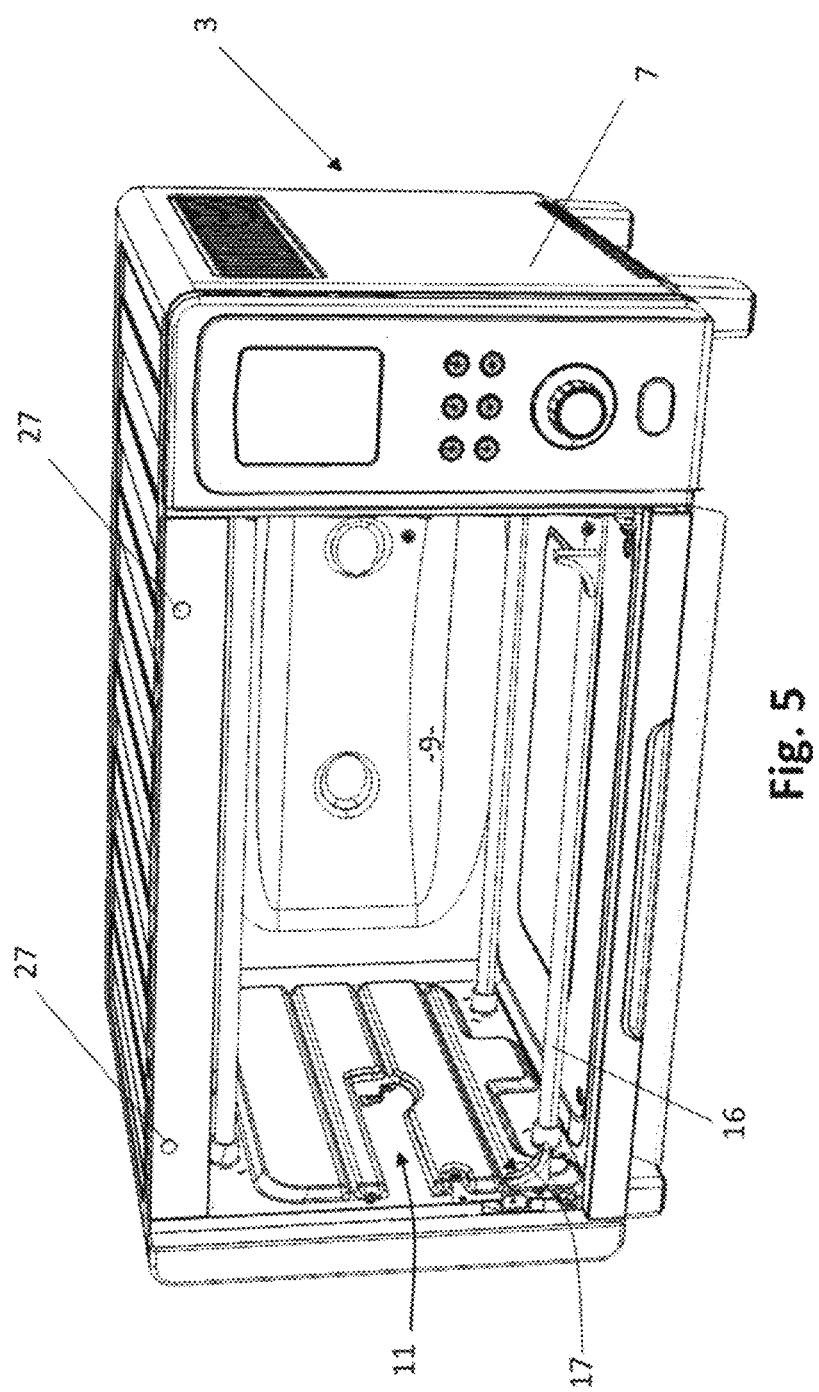
FIG. 5 is a perspective view of the mini-oven illustrated in FIG. 1 without a door.
Figure 6:
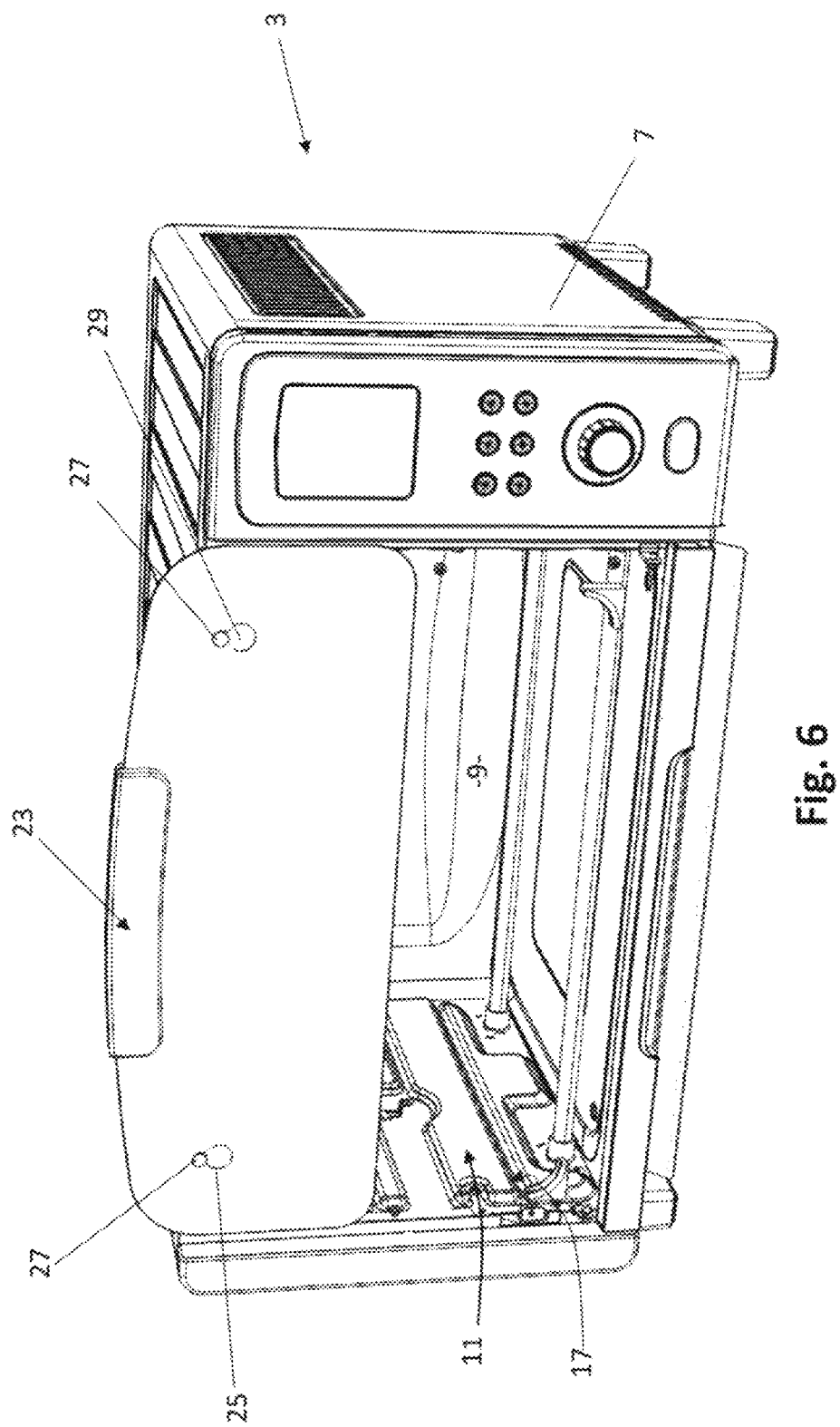
FIG. 6 is a perspective view of the mini-oven without a door illustrated in FIG. 5 and of the covering member illustrated in FIG. 1 connected to the mini-oven without a door.

The cooking cavity 9 comprises at least one electric heating element 16 used to raise the temperature of the cooking cavity 9 in order to cook foods inside the cooking cavity 9 when the mini-oven 3 is turned on. As illustrated in FIGS. 1, 5 and 6, the cooking cavity 9 comprises multiple pairs of grooves 17, the two grooves of each pair being formed respectively in the interior walls on opposite sides of the cooking cavity 9 and arranged such that they extend in parallel along the interior walls. The grooves 17 are configured to receive the respective edges of a rack 18 in order to support and hold the rack 18 along a plane which is essentially parallel to a surface on which the mini-oven 3 may be supported and in order to allow the rack 18 to slide into and out of the cooking cavity 9. Multiple pairs of grooves 17 are arranged at various heights along the interior side walls such that it is possible to place one or more racks 18 at various heights inside the cooking cavity 9 so that foods can be supported on the rack 18 or on each rack 18 in various regions of the cooking cavity 9 according to the type of food and type of cooking, for example, general oven cooking, broiling or roasting.

Figure 3:
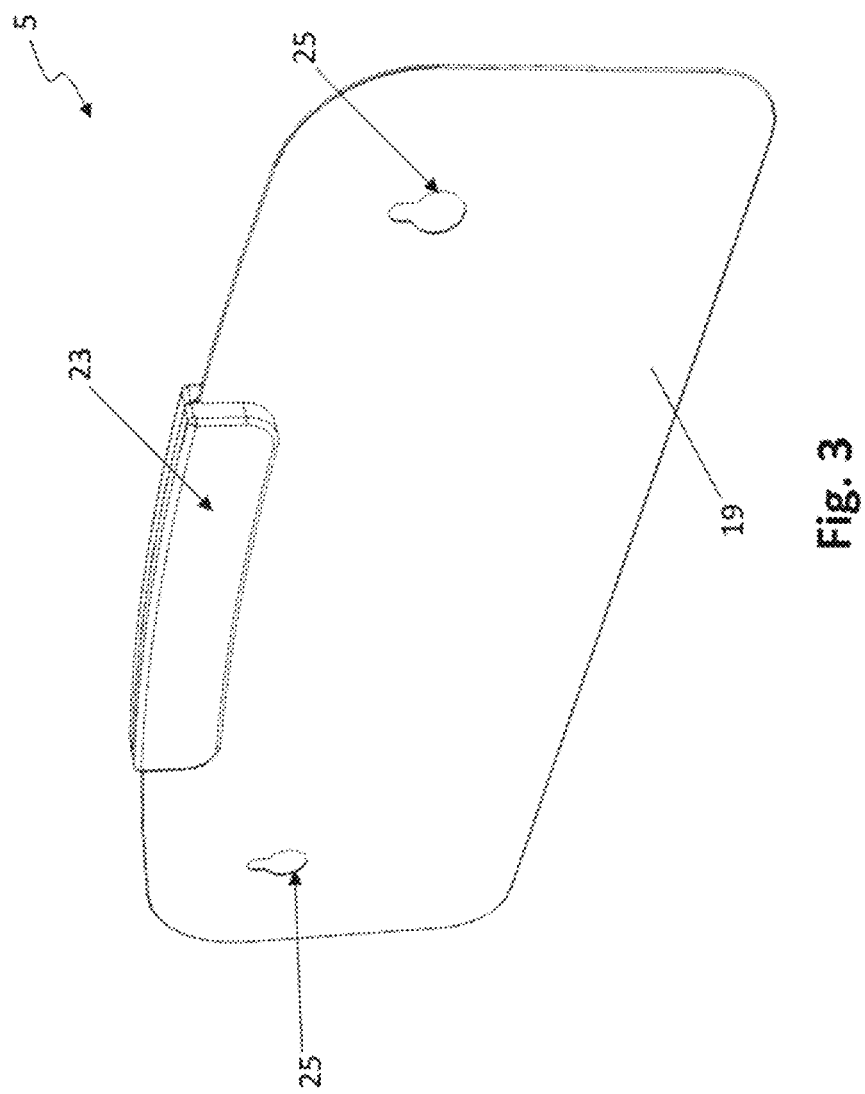
FIG. 3 is a perspective view of the covering member illustrated in FIG. 1.
Figure 4:
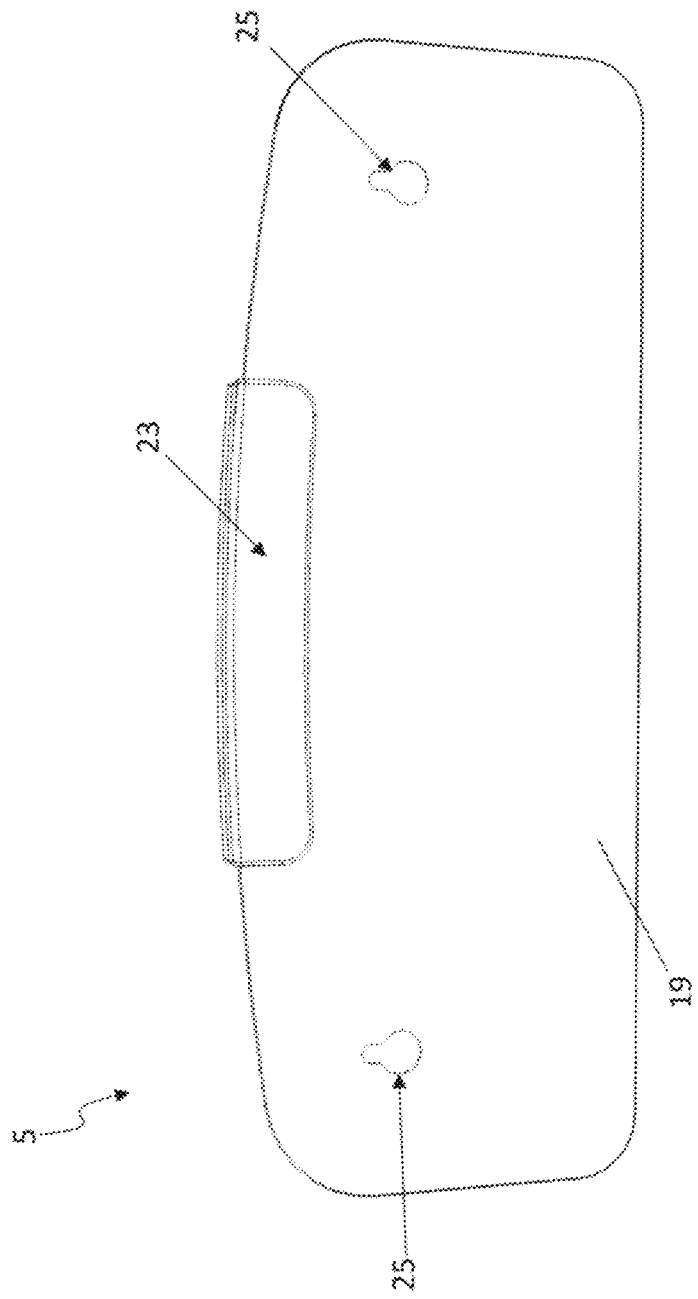
FIG. 4 is a front view of the covering member illustrated in FIG. 1.
Figure 8:
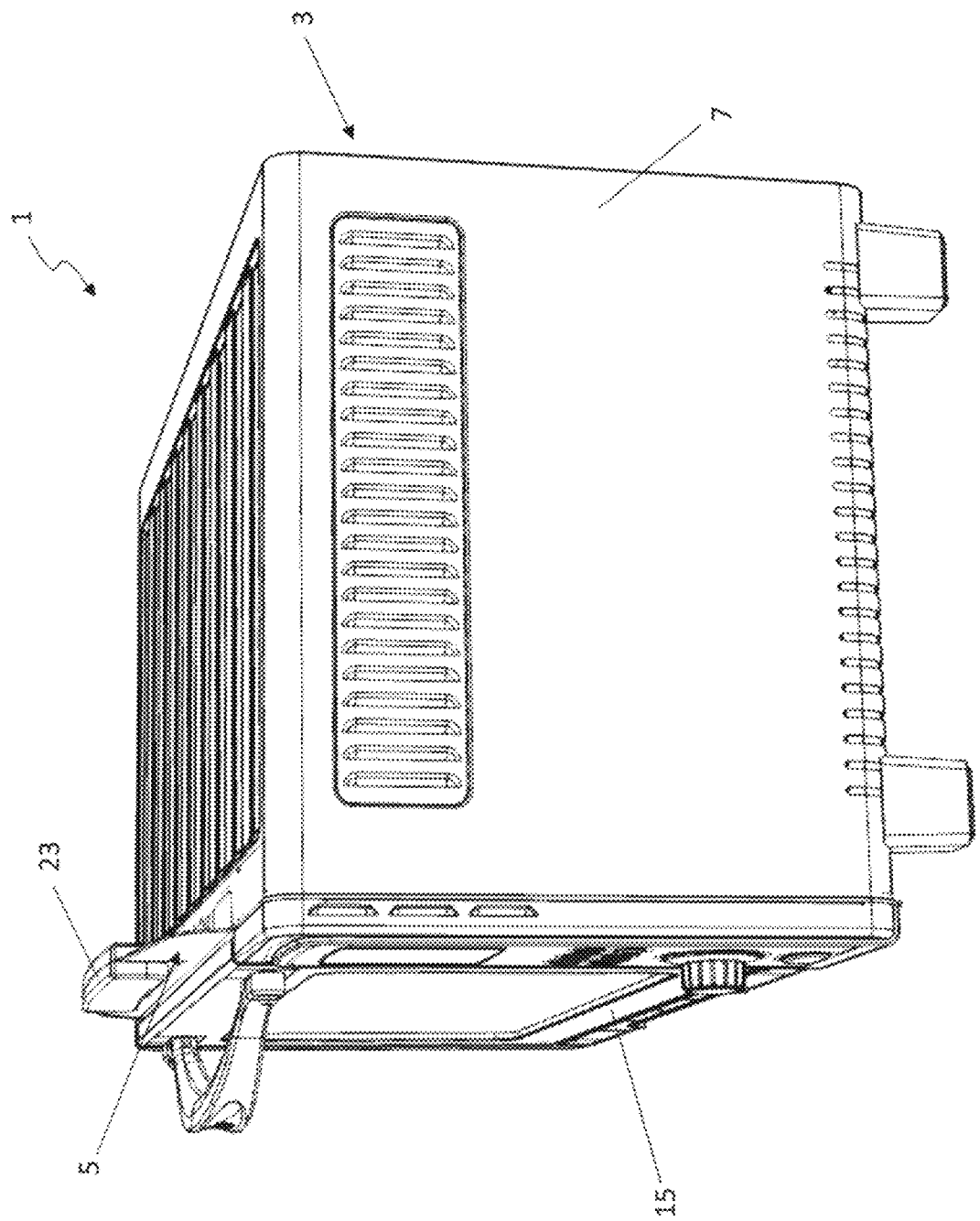
FIG. 8 is a perspective profile view of the assembly forming a mini-oven illustrated in FIG. 1.

In reference in particular to FIGS. 3 and 4, the covering member 5 comprises an essentially rectangular body 19, presented in the form of a metal sheet comprising a reflective surface intended to reflect the heat radiation so as to send it back to the cooking cavity 9 when it is in place. The body 19 may be formed from any suitable material such as stainless steel, high carbon steel or aluminum, it may also comprise thermal insulation, and is sized and designed to cover a part of the opening 11 when it is connected appropriately to the mini-oven 3 as illustrated in FIG. 5. The body 19 is sized such that at least a portion of the body 19 can be lodged between the cooking cavity 9 and the door 15 of the mini-oven when the door 15 of the mini-oven is in the closed state, as illustrated for example in FIG. 8. In other words, at least a portion of the body 19 is thin enough to be lodged between the cooking cavity 9 and the door 15 when it is in a closed state, without affecting the ability of the oven door 15 to be closed.

Figure 7:
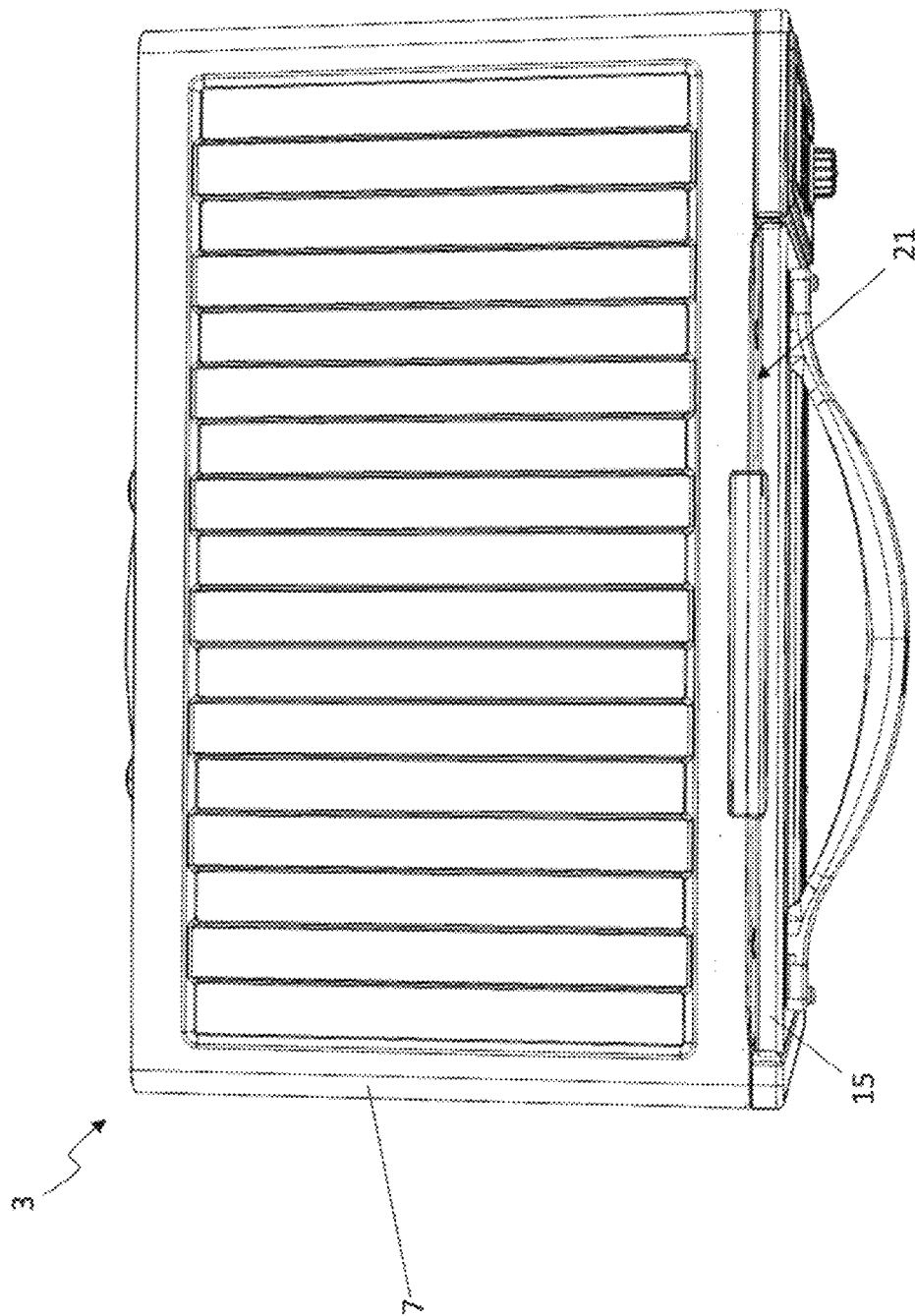
FIG. 7 is a top view of the mini-oven illustrated in FIG. 1.

To facilitate this, as illustrated in FIG. 7, a small space 21 is formed between the top front edge of the frame 7 and the oven door 15 when it is in the closed position. The space 21 allows the covering member 5 to extend from the outside of the mini-oven 3 and between the door 15 and the frame 7. The space 21 may be inherent in an existing mini-oven 3 or specifically arranged in a mini-oven 3 so that there is sufficient space for the covering member 5.

The covering member 5 also comprises a handle 23 at least partially consisting of a thermal insulation material and fixed to an upper edge of the body 19 so as to allow safe manipulation of the covering member 5 which may be hot during use. The handle 23 is positioned on the covering member 5 so as to be situated outside of the mini-oven 3 when the covering member 5 is connected to the mini-oven 3 so that it is not directly exposed to the heat energy coming from the cooking cavity 9, when the mini-oven 3 is in the process of being used. The handle 23 may have an ergonomic shape allowing the user to grip it when it is connected to the mini-oven 3 so that it is easy to remove the covering member 5 from the mini-oven 3 and to fix the covering member 5 to the latter.

In order to facilitate the fixing of the covering member 5 to the mini-oven 3, the covering member 5 also comprises a pair of connectors 25 in the form of keyhole-shaped openings 25 which are formed through the body 19. In reference to FIG. 9, the keyhole-shaped openings 25 each comprise a first section 29 with a larger diameter and a second section 31 with a smaller diameter, positioned above the first section 29 when the covering member 5 is in a normal orientation of use. The two openings 25 are formed respectively on opposite sides of the covering member 5 and placed so as to cooperate with a pair of complementary connectors in the form of projections 27 extending from the top front face of the mini-oven 3. The projections 27 extend from the front face of the mini-oven 3 over a sufficient distance to engage with the openings 25 of the covering member 5 but without interfering with the closing of the oven door 15.

In reference to FIGS. 10a and 10b, the projections 27 each comprise a cylindrical projection body 33 with a length greater than the width of the body 19 of the covering member 5. A circular projection head 35 is formed at the terminal end of each projection body 33 and has a diameter greater than that of the cylindrical projection body 33. The projection head 35 forms a lip 37 at the interface between the projection head 35 and the projection body 33. In reference to FIGS. 11a and 11b, the projection head 35 has a smaller diameter than that of the larger-diameter first section 29 of the keyhole-shaped opening 25 so as to allow the projection 27 to be inserted through this section of the opening 25. Conversely, the projection head 35 has a diameter larger than the width or the diameter of the smaller-diameter second section 31 of the keyhole-shaped opening 25 such that, when the projection 27 is inserted through the opening 25 and the covering member 5 is manipulated in order to position the projection 27 inside the smaller-diameter second section 31 of the opening 25, the covering member 5 is held by the projections 27 because of the engagement of the lips 37 of the projections 27 with the body 19 of the covering member 5, as illustrated in FIG. 11b.

As persons skilled in the art will understand, other appropriate system for fixing the covering member 5 to the mini-oven may be used. For example, the connectors may comprise one or more magnets configured to attract the covering member 5 towards the mini-oven 3, either because of the magnetic properties of the material of the mini-oven 3, or by means of a magnet correspondingly positioned on the mini-oven 3. As a variant, the connectors may comprise a screw configured to extend through an opening formed in the covering member 5 and into a screw hole formed in the frame 7 of the mini-oven 3. In another variant, the mini-oven 3 may comprise a pair of vertically oriented grooves or slots, arranged on opposite sides of the opening 11, each groove or slot being intended to receive an edge of the covering member 5 so as to allow the covering member 5 to slide into the grooves and be secured in place across a part of the opening 11. In this other variant, the mini-oven 3 may also comprise one or more stops in order to prevent the covering member 5 from sliding too far across the opening 11.

In reference to FIG. 1, a pair of disk-shaped rubber damping elements 39 are fixed to the inside of the oven door 15 and positioned such that when the oven door 15 is in a closed position and the covering member 5 is connected to the mini-oven 3 by means of projections 27, the rubber damping elements 39 are placed within the limits of the first larger-diameter sections 29 of the corresponding openings 25 and in contact with the frame 7 of the mini-oven 3 across the covering member 5. In the embodiment described, the dimensions of the rubber damping elements 39 are chosen such that, when the door 15 is in the closed position and the rubber damping elements 39 are in contact with the frame 7 across the covering member 5, the rubber damping elements 39 hold the oven door 15 in a position separated from the frame 7 by a sufficient distance to create a space 21 required for inserting the covering member 5 between the oven door 15 and the frame 7. The rubber damping elements 39 may also be sized in order to prevent the oven door 15 from coming into contact with the projection heads 35 when the oven door 15 is in the closed position, so as to prevent the projections 27 from damaging the door 15. In addition or as a variant, a pair of recesses 41 may be formed in the interior surface of the oven door 15 at locations adjacent to the projections 27 when the oven door 15 is in the closed position, in order to accommodate at least a portion of the projection heads 35 and to guarantee that the projections 27 do not damage the oven door 15 and do not prevent the oven door 15 from closing properly.

The form and the dimensions of the body 19 of the covering member 5 are chosen such that, when the covering member 5 is connected to the mini-oven 3 by the engagement of the keyhole-shaped openings 25 with the projections 27, the covering member 5 extends downwards from the upper part of the mini-oven 3 and partially across the opening 11 leading to the cooking cavity 9. In reference to FIG. 6, the dimensions of the covering member 5 are such that, when it is in place and connected to the mini-oven 3, the covering member 5 blocks an upper part of the opening 11 but leaves a lower part of the opening 11 free so that foods can be transferred between the cooking cavity 9 and the outside of the mini-oven 3 when the mini-oven door 15 is in an open position. As illustrated most clearly in FIG. 1, the form and the dimensions of the body 19 of the covering member 5 are also chosen such that, when it is in place and connected to the mini-oven 3, a rack 18 installed on a pair of grooves 17 is not covered by the covering member 5, such that the rack can be transferred between the cooking cavity 9 and the outside of the mini-oven without obstruction caused by the covering member 5. Consequently, foods can be arranged on a rack and inserted into the cooking cavity 9 in order to be supported by a pair of grooves 17 even when the covering member 5 is in place and extends partially across the upper part of the opening 11.

During use, the mini-oven door 15 is moved to an open position and the covering member 5 is connected to the mini-oven 3 by the engagement of the keyhole-shaped openings 25 with the projections 27 by means of appropriate arrangement and manipulation of the sections 29, 31 of the openings 25 relative to the projections 27 as described above. When the covering member 5 is connected to the mini-oven 3, the mini-oven door 15 is closed and the mini-oven 3 is turned on in order to raise the temperature of the cooking cavity 9 to a desired cooking temperature. Once the target cooking temperature is reached, the oven door 15 is opened and the foods are transferred either directly to a rack 18 inside the cooking cavity 9 and found in a clear region of the cooking cavity 9, or by inserting a rack 18 supporting the foods into the grooves 17 situated in a clear region of the cooking cavity 9. Because of the presence of the covering member extending partially across the opening 11 at an upper part of the opening 11, the heat energy loss from the cooking cavity 9 by radiation and/or convection, when the oven door 15 is opened, is reduced. Consequently, the temperature of the cooking cavity 9 is either maintained, or only slightly decreased even though the oven door 15 is opened for the transfer of foods. The cooking time is thus reduced and the energy efficiency of the mini-oven 3 is increased.

Once the foods are cooked, the covering member 5 can be safely removed by separating the openings 25 from the projections 27 and transporting the covering member 5 by the handle 23 to a safe location and/or for cleaning purposes.

Figure 12B:
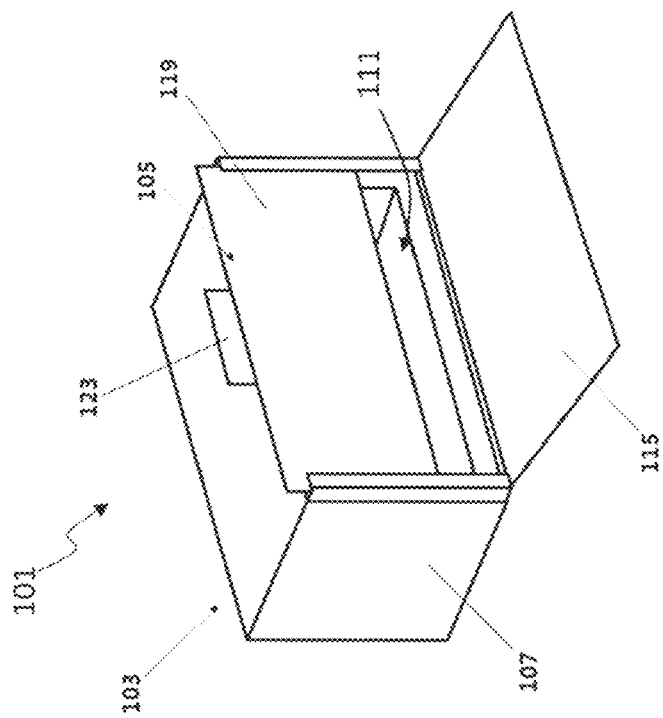
FIG. 12b is a perspective view of the assembly forming a mini-oven illustrated in FIG. 12a when the covering member is at least partially connected to the mini-oven.
Figure 12A:
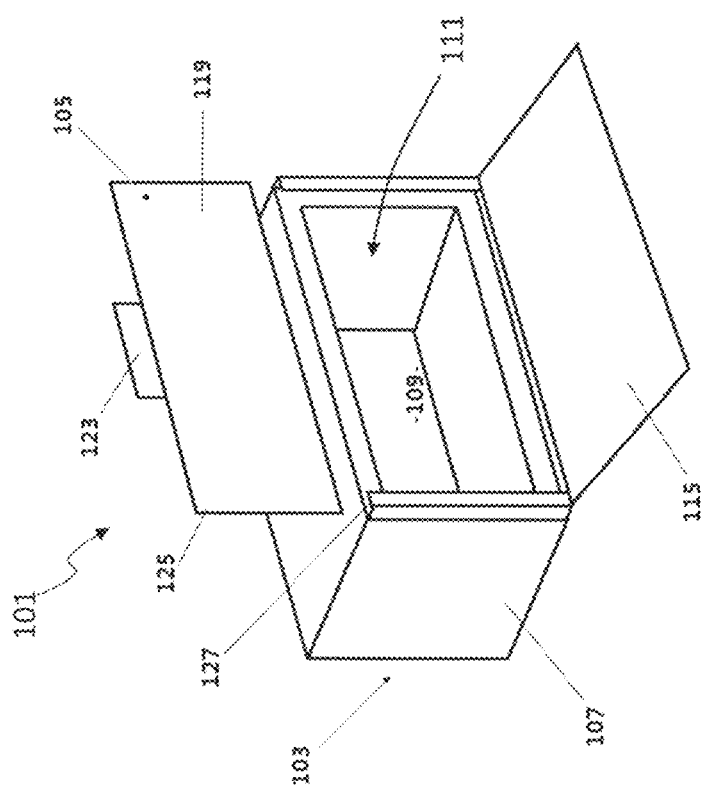
FIG. 12a is a perspective view of a variant of the assembly forming a mini-oven comprising a mini-oven and a covering member in the process of being connected to the mini-oven, when the mini-oven door is in the open position.

In reference to FIGS. 12a and 12b, in an embodiment variant, the assembly forming a mini-oven 101 comprises a covering member 105 comprising a body 119 formed from a sheet of material and designed to cover at least partially the opening 111 of the mini-oven 103 when it is arranged between the cooking cavity 109 and the outside of the oven when the door 115 is in an open position. In this other embodiment, the connectors of the covering member 105 comprise the side edges 125 of the covering member 105 which are designed to be received by a pair of grooves or throats 127 having a complementary shape, formed respectively on opposite sides of the frame 107 of the mini-oven, on each side of the opening 111. During use, the covering member 105 is put into place by making it slide along the throats 127 from the upper part of the mini-oven 103. The covering member 105 can be sized and designed so as to cover the entire opening 111 or only a portion of the opening 111 when it is positioned along the throats 127. The mini-oven 103 may also comprise one or more stops intended to prevent the covering member 105 from sliding too low along the throats 127. This second embodiment has the benefit of making it possible for a user to make the covering member 105 slide by means of the handle 123 to various positions along the throats 127 in order to increase or decrease access to the opening and, consequently, to allow small or large foods to be transferred between the cooking cavity 109 and the outside of the oven, and also to regulate the quantity of heat energy that can be lost from the cooking cavity 109.

Figure 13B:
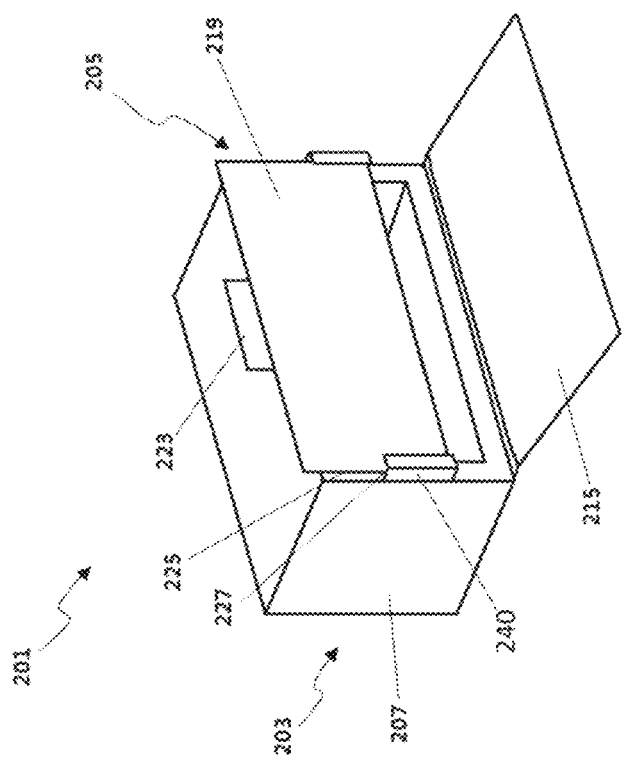
FIG. 13b is a perspective view of the assembly forming a mini-oven illustrated in FIG. 13a when the covering member is at least partially connected to the mini-oven.
Figure 13A:
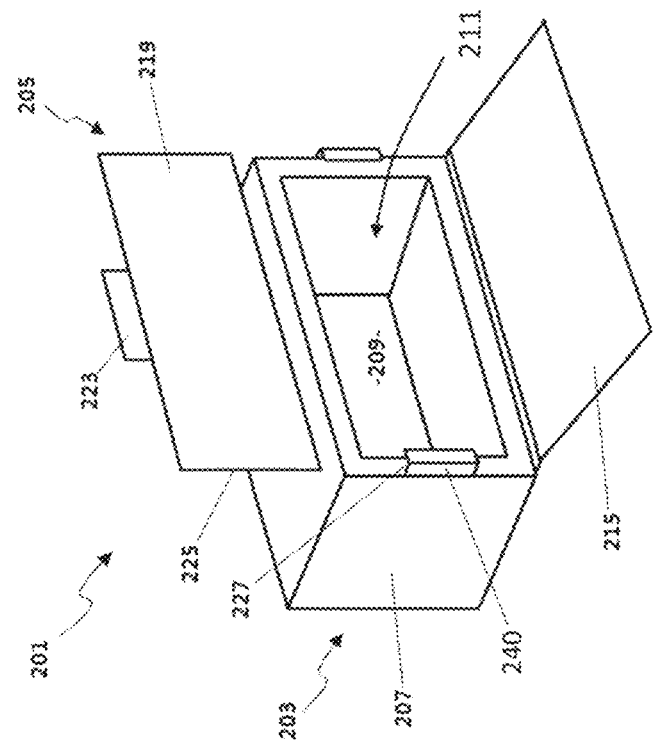
FIG. 13a is a perspective view of another variant of the assembly forming a mini-oven comprising a mini-oven and a covering member in the process of being connected to the mini-oven, when the mini-oven door is in the open position.

In reference to FIGS. 13a and 13b, in another embodiment variant, the connectors 227 of the mini-oven 203 are made in the form of a groove or throat 227 from an adaptor 240 that can be fixed to a part of the frame 207 of the mini-oven 203 so as to allow a covering member 205 to be connected to the mini-oven 203 when the door 215 is in an open position. As persons skilled in the art will easily understand, the adapter 240 can be fixed to the frame 207 of the mini-oven 203 by means of any suitable fixing system such as magnets, screws or hooks. When they are not being used, the adapters 240 can be detached and separated from the rest of the mini-oven 203 so as to restore the mini-oven 203 to its normal functional state. Thus, in this embodiment variant, the connectors 227 of the mini-oven 203 integrated in the adapters 240 are removable.

As illustrated in FIG. 13a, the pair of adapters 240 is fixed respectively to the frame 207 on opposite sides of the opening 211 of the cooking cavity 209 to receive the edges of the sides of the covering member 205 along the throats 227. It is envisioned that the adapters may, as a variant, be part of a rack or shelf intended to be used with a mini-oven, the adapters then being positioned on the rack such that, during insertion of the rack in the cooking cavity 209, the adapters 240 are positioned for purposes of interaction with complementary connectors 225, for example edges 225, of the covering member 205 so as to hold the covering member 205 at least partially across the opening 211.

The person skilled in the art will understand that the connectors 227 of the adapter 240 can take any form necessary to interact with complementary connectors 225 of the covering member 205 so as to allow the covering member 205 to be connected to the mini-oven 203. For example, if the complementary connectors 225 of the covering member 205 comprise one or more keyhole-shaped openings as described above, the connectors 227 of the adapter 240 may comprise one or more projections intended to engage with the covering member 205.

The use of one or more adapters 240 is beneficial in that it makes it possible to render any mini-oven 203 compatible for the purposes of connecting a covering member 205 to the mini-oven 203, via an adjustable side edge of the covering member 205 serving as complementary connector 225 of the connector 227. Thus, the frame 207 of the mini-oven does not necessarily have to be specifically designed for the purposes of connecting a covering member 205.

In reference to FIG. 14, it is envisioned that the covering member 305 can be constructed so as to allow the dimensions or the shape of the covering member 305 to be modified according to the type of mini-oven to which the covering member 305 is intended to be connected. In the embodiment represented, the covering member 305 comprises two body parts 319a, 319b which are slidably engaged so as to allow a modification of the width of the covering member 305. In this embodiment, each part 319a, 319b may comprise a corresponding handle 323a, 323b so as to allow safe manipulation of the covering member 305 after exposure to heat energy. The dimensions and/or the shape of such a covering member 305 may, beneficially, be adapted according to the dimensions and/or the shape of the opening of the cooking cavity of a mini-oven such that the covering member 305 can be used with mini-ovens of various dimensions.

Figure 15B:
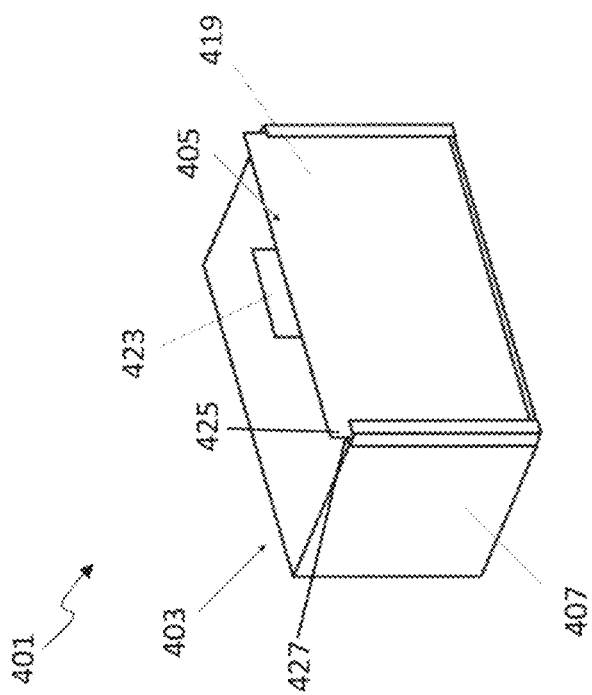
FIG. 15b is a perspective view of the embodiment illustrated in FIG. 15a in a closed state.
Figure 15A:
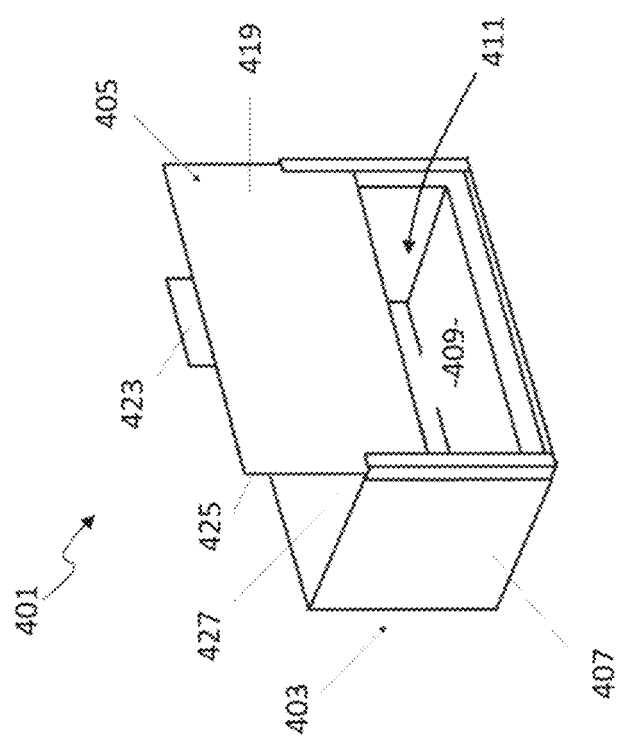
FIG. 15a is a perspective view of an embodiment variant of the invention in a partially open state.

In reference to FIGS. 15a and 15b, it is envisioned that the covering member 405 may perform the function of a mini-oven door without the need for an additional door to completely close the mini-oven when the covering member is in place. In the embodiment represented, the mini-oven 403 comprises a pair of throats formed on each side of the cooking cavity 409 of the mini-oven and designed and configured to receive the edges of the covering member 405, serving as complementary connectors 425 of the connectors 427 of the mini-oven 403. Thus, the covering member 405 is able to slide along the throats 427 in a direction essentially parallel to the plane of the opening 411 into a certain number of different positions between a completely open state and a completely closed state. Consequently, the covering member 405 may slide to a position in which it is possible to access the cooking cavity 409 without totally exposing the cooking cavity 409 to the outside of the mini-oven and causing unnecessary heat loss. This may be particularly beneficial when a food is small enough not to require exposing the totality of the opening 411 leading to the cooking cavity 409 for transferring the food between the cooking cavity 409 and the outside of the mini-oven. The throats 427 and/or the covering member 405 may comprise mutually cooperating attributes that may come into contact with one another at various intervals along the throats 427 so as to keep the covering member 405 in a particular partially open state. This prevents the user from having to continually keep the covering member 405 in a desired partially open state and, consequently, allows a user of the assembly forming a mini-oven 401 to have two hands free for transferring foods.

Configuring the covering member 405 such that it slides in a direction essentially parallel to the plane of the opening 411 allows foods to be transferred between the cooking cavity 409 and the outside of the mini-oven in a direction essentially parallel to the plane of the opening 411. Consequently, it is possible to transfer foods between, for example, a rack or a drip pan arranged horizontally inside the cooking cavity 409 without having to incline or tilt the foods during transfer, such that the probability that the foods will fall during transfer is minimized.

Figure 16B:
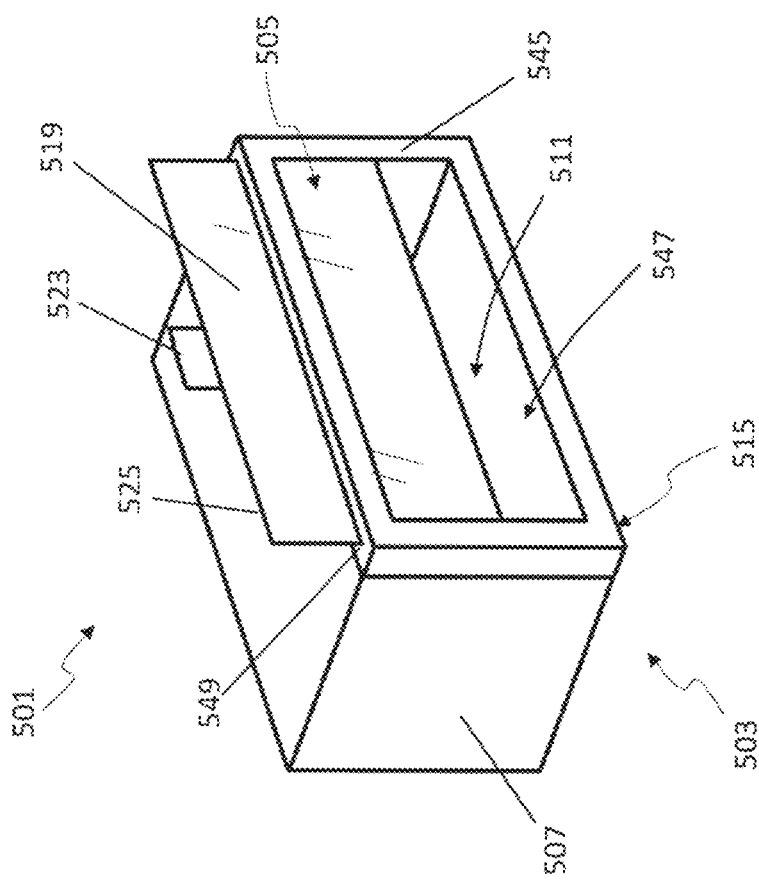
FIG. 16b is a perspective view of the embodiment illustrated in FIG. 16a in a configuration in which it is possible to access a cooking cavity of the mini-oven.
Figure 16A:
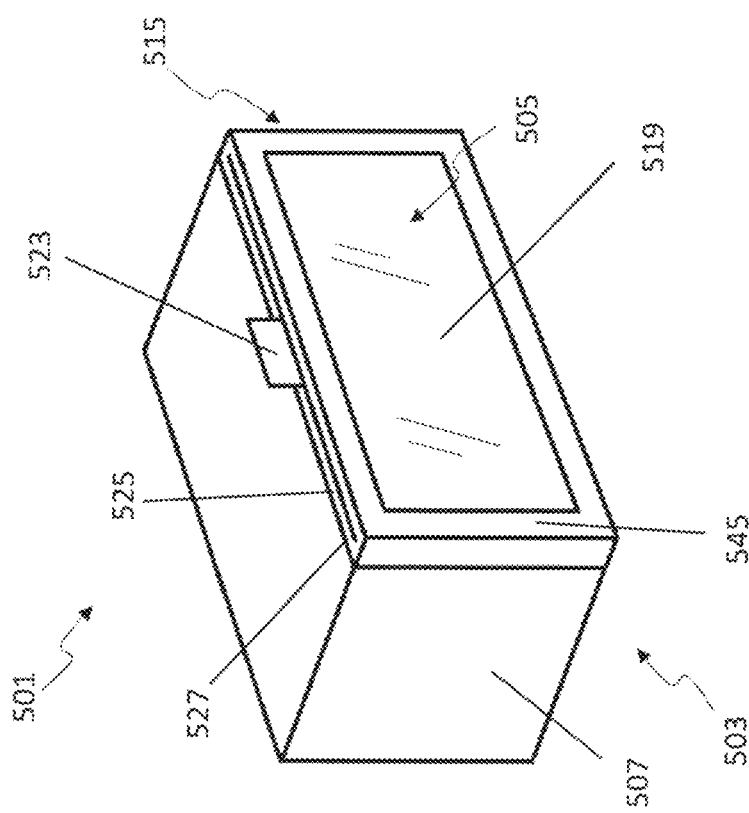
FIG. 16a is a perspective view of another embodiment configuration of this invention in a closed state.
Figure 17:
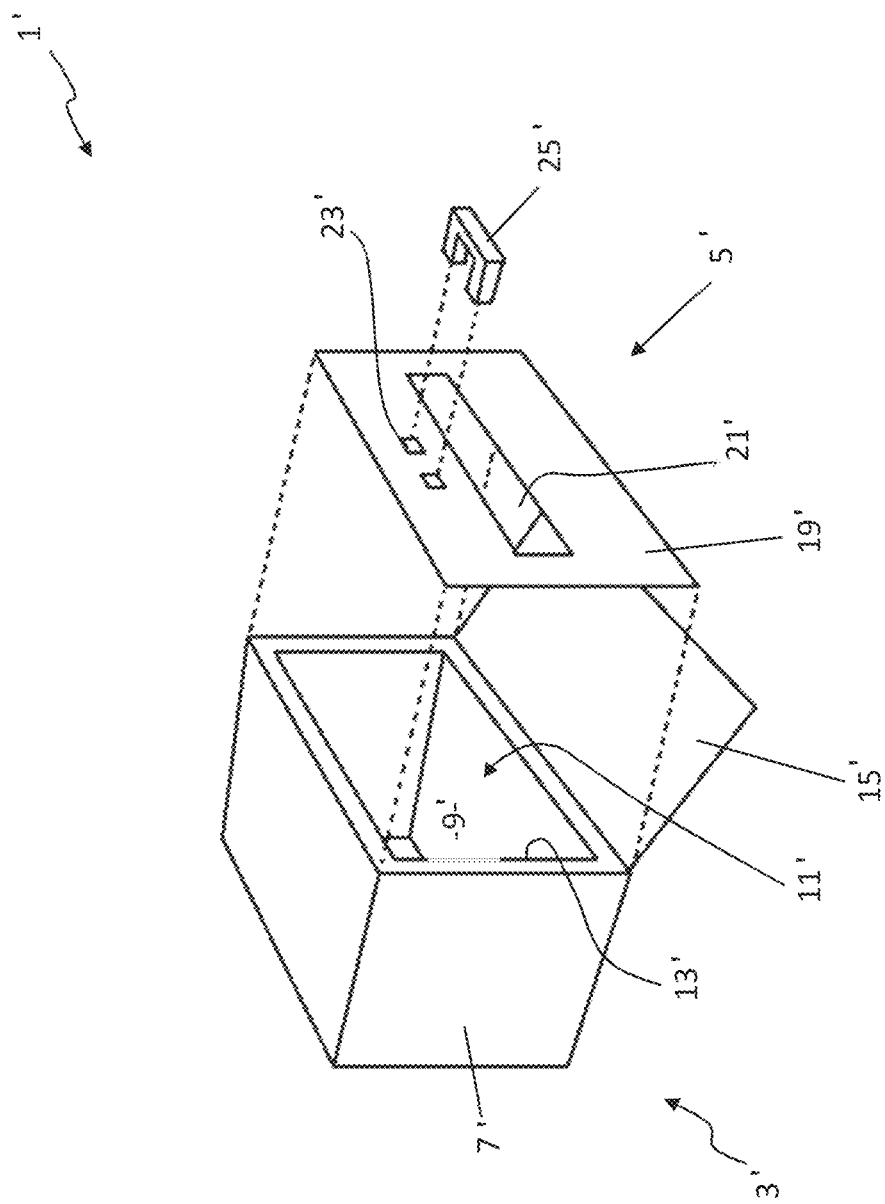
FIG. 17 shows an exploded view of a mini-oven assembly and of a cover according to the first embodiment of a variant of the invention, the mini-oven door being in an open state.

In reference to FIGS. 16a, 16b and 16c, in another embodiment variant, the covering member 505 may be integrated in the door 515 of the mini-oven 503. In the embodiment represented, the mini-oven door 515 is hingedly fixed to the frame 507 of the mini-oven 503 such that it can be moved according to a succession of positions between a completely closed state, in which access to the cooking cavity 509 is limited, and a completely open state, in which access to the cooking cavity 509 through the opening 511 is not blocked by the door 515. The door 515 of the oven comprises a frame 545 which defines a space or an opening 547 inside of which a window can usually be positioned, and a slot 549 formed in an upper side of the frame for receiving a covering member 505 with an upper edge acting as complementary connector 525 of the correspondingly shaped connector 527 of the mini-oven 503. The oven door 515 may also comprise a pair of throats (not illustrated) arranged on each side of the opening 547 of the oven door to receive correspondingly shaped edges of the covering member 505 for purposes of engagement and guidance of the covering member 505 according to a sliding configuration.

In reference in particular to FIG. 16b, the covering member 505 is designed and configured to be inserted into the opening 547 of the door defined by the frame 545 of the door by means of the slot 549 and to slide to various positions relative to the frame 545 of the door. Thus, when the door 515 is in a closed position, as illustrated in FIGS. 16a and 16b, in which the opening 547 of the door is blocked, it is possible to make the covering member 505 slide in an upward direction by means of the handle 523 in order to unblock the opening 547 of the door and allow access to the cooking cavity 509 through the mini-oven opening 511 even when the oven door 515 is closed. Consequently, the covering member 505 may be moved to a succession of different positions in order to vary the extent to which it is possible to access the cooking cavity 509 according to what is needed for a particular food, without excessively exposing the cooking cavity 509 to the outside of the mini-oven. The covering member 505 may at least partially consist of glass such that, when it is placed inside the space 547 of the door in a blocking configuration, it is still possible to see the cooking cavity 509 through the covering member 505 such that the progress of cooking a food can be observed.

If total access, without blockage, to the cooking cavity 509 is required, the covering member 505 can be placed in the closed position illustrated in FIG. 16a, in which the opening 547 is completely blocked by the covering member 505 and the totality of the door 515, including the covering member 505, can be moved to a completely open position as illustrated in FIG. 16c. This may be desirable when the cooking cavity 509 requires cleaning or when a particular voluminous food, larger in size than the door opening 547, must be transferred between the cooking cavity 509 and the outside of the mini-oven.

Concerning the variant illustrated in FIGS. 17 to 36, FIGS. 17 to 20 show a mini-oven 1' assembly comprising a mini-oven 3' and a cover 5' in the form of an accessory to be fixed to the mini-oven 3'. The mini-oven 3' comprises a frame 7' which defines a cooking cavity 9' comprising a substantially rectangular opening 11' defined by an edge 13' allowing access to the cooking cavity 9'. The mini-oven 3' also comprises a door 15' which is fixed by a hinge to the frame 7' of the mini-oven 3' and which can be moved between a first position in which the door 15' of the mini-oven 3' is in a closed state and extends across the opening 11' and a second position in which the door of the mini-oven 3' is in an open state to allow access to the cooking cavity 9' such that a user can transfer foods between the cooking cavity 9' and the outside of the mini-oven 3'.

Figure 20:
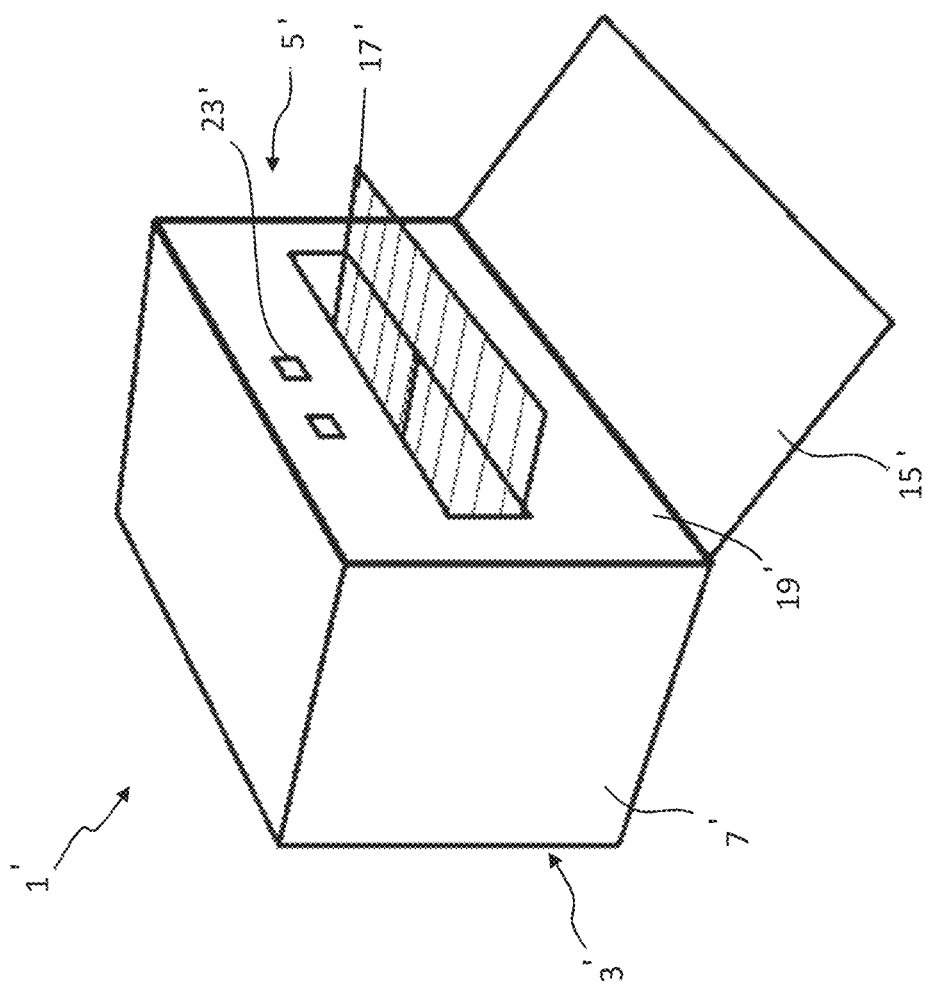
FIG. 20 shows a perspective view of the mini-oven and the cover of FIG. 17 in an assembled state, the mini-oven door being in an open state and a rack extending from a cooking cavity of the mini-oven through a slot in the cover.
Figure 21:
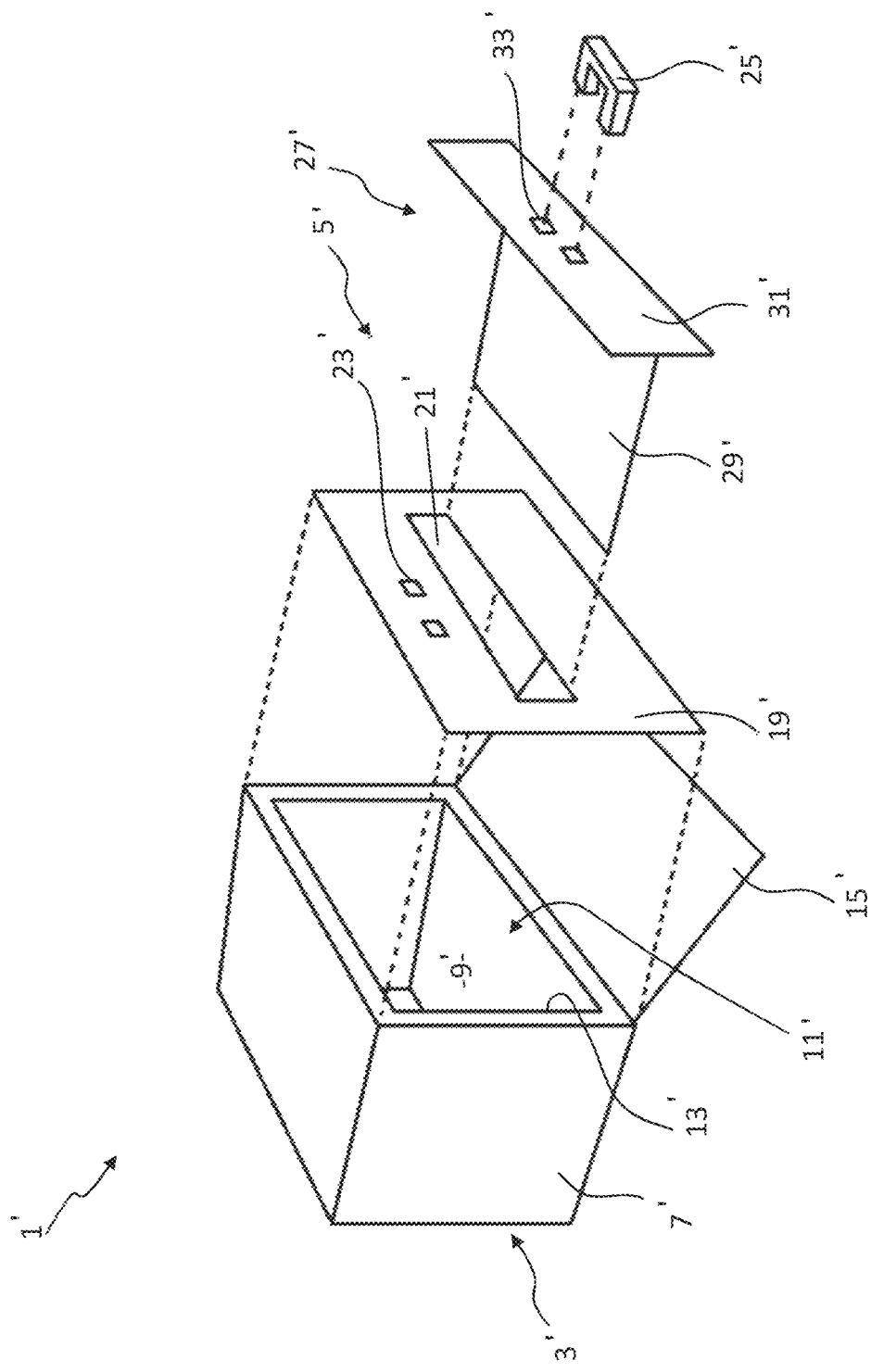
FIG. 21 shows an exploded view of the mini-oven and the cover represented in FIG. 17 with an additional part of the cover, and the mini-oven door being in an open state.

The cooking cavity 9' comprises at least one electric heating element (not represented here) for cooking foods inside the cooking cavity 9' when the mini-oven 3' is activated. As indicated in FIG. 20, the cooking cavity 9' also comprises at least one rack 17' for holding foods at desired heights inside the cooking cavity 9'. The at least one rack 17' is supported inside the cooking cavity 9' by a pair of grooves (not represented here) which are formed on opposite sides respectively of the interior walls of the cooking cavity 9' and arranged such that they extend in parallel and along the interior walls. The grooves are configured to receive the respective edges of a rack 17' to support and hold the rack 17' along a plane which is substantially parallel to a surface on which the mini-oven 3' may be supported and in order to allow the rack 17' to slide while entering and exiting the cooking cavity 9'.

Figure 19:
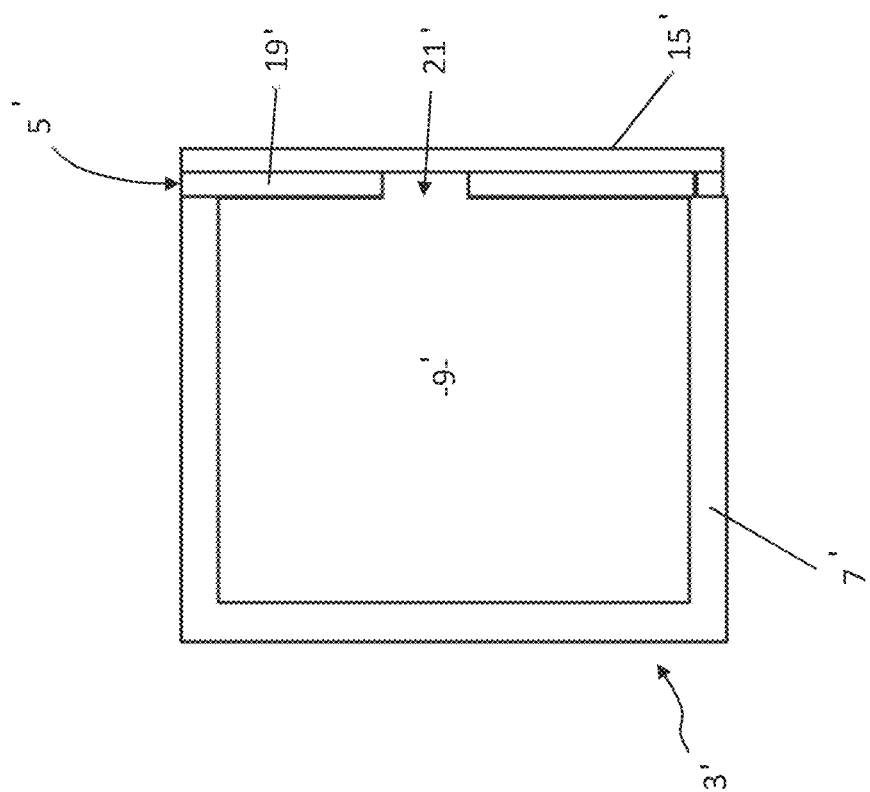
FIG. 19 is a cross-sectional view of the mini-oven and the cover of FIG. 17 in an assembled state, the mini-oven door being in a closed state.
Figure 18:
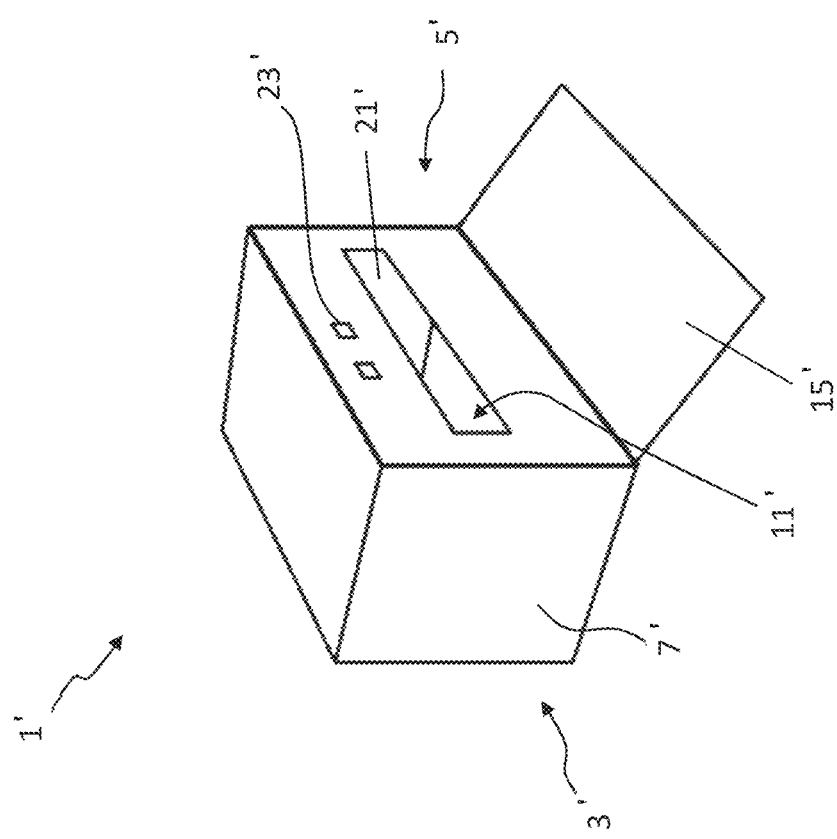
FIG. 18 shows a perspective view of the mini-oven and the cover of FIG. 17 in an assembled state, the mini-oven door being in an open state.

The cover 5' comprises a body 19' having a substantially rectangular shape in the form of a metal sheet with a reflective surface for reflecting the heat radiation towards the inside of the cooking cavity 9'. The body 19' may be formed of any metal suitable for this purpose, such as stainless steel, carbon steel or aluminum, it may also comprise thermal insulation, and is sized and configured to cover the opening 11 when it is arranged adjacent to and across the opening as indicated in FIG. 18. The body 19' is sized to rest between the cooking cavity 9' and the door 15' of the mini-oven 3' when the door 15' of the mini-oven 3' is in a closed state, as indicated in FIG. 19. A rectangular slot 21' is formed through the body 19' to allow food products to be transferred between the cooking cavity 9' and the outside of the mini-oven 3' by means of the slot 21' when the cover 5' is arranged to extend across the opening 11'. The cross section of the slot 21' is smaller than the cross section of the opening 11' in order to reduce the exposure of the cooking cavity 9' to the outside of the mini-oven 3' during transfer of foods between the cooking cavity 9' and the outside of the mini-oven 3'. In an embodiment, the cross section of the slot 21' is at least 20% smaller than the cross section of the opening 11'.

In the embodiment described, the shape of the slot 21' is chosen such that its width is greater than its height and to receive food products that are thin but potentially wide, such as pizzas and bread slices, which do not require complete opening 11' in order to be inserted into and removed from the cooking cavity 9'. In reference to FIG. 20, the slot 21' is positioned such that when the body 19' of the cover 5' is arranged adjacent to the opening 11', such that it extends across the opening 11', the slot 21' is substantially aligned with a rack 17' inside the cooking cavity 9'. The slot 21' is also shaped and sized to allow the rack 17' to pass through the slot 21' between the cooking cavity 9' and the outside of the mini-oven 3'.

The body 19' of the cover 5' may also comprise one or more formations 23' configured to connect to each other with characteristics cooperating with a handle 25'. It will be appreciated by the person skilled in the art that many variants are possible to allow the handle 25' to be connected to the body 19', however, in the embodiment described, the formations 23' comprise reinforcements in which hook-shaped projecting parts (not represented here) of the handle 25' may be inserted for connecting the handle 25' to the body 19'. The mutually cooperating characteristics of the handle 25' and of the body 19' allow the handle 25' to be easily connected to and disconnected from the body 19' so that a user can maneuver the body 19' by means of the handle 25'. This may be particularly beneficial when the body 19' becomes so hot during the use of the mini-oven 3' that the body 19' cannot safely be directly manipulated by a user.

In reference to FIGS. 21 to 24, the cover 5' may also comprise a food support 27' comprising a substantially flat plate, metal rack or sheet 29', made of a metal such as stainless steel, and a flange 31' which extends from one extremity of the sheet 29' such that the flange 31' is substantially perpendicular to the sheet 29'. The sheet 29' is sized such that it can be inserted through the slot 21' of the body 19' of the cover 5' and extend into the cooking cavity 9' when the cover 5' is arranged across the opening 11'. The sheet 29' may be shaped and configured so as to perform the function of a rack 17' and to be received by the grooves of the cooking cavity 9' or such that it can simply rest on a rack 17' arranged inside the cooking cavity 9'.

Figure 24:
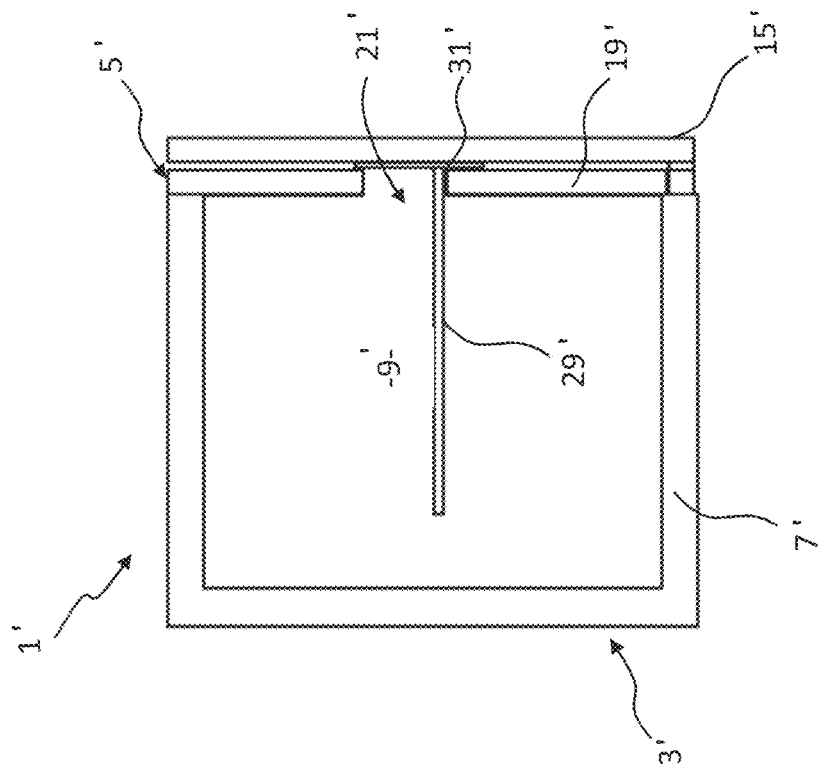
FIG. 24 is a cross-sectional view of the mini-oven and the cover of FIG. 21 in an assembled state, the mini-oven door being in a closed state.
Figure 23:
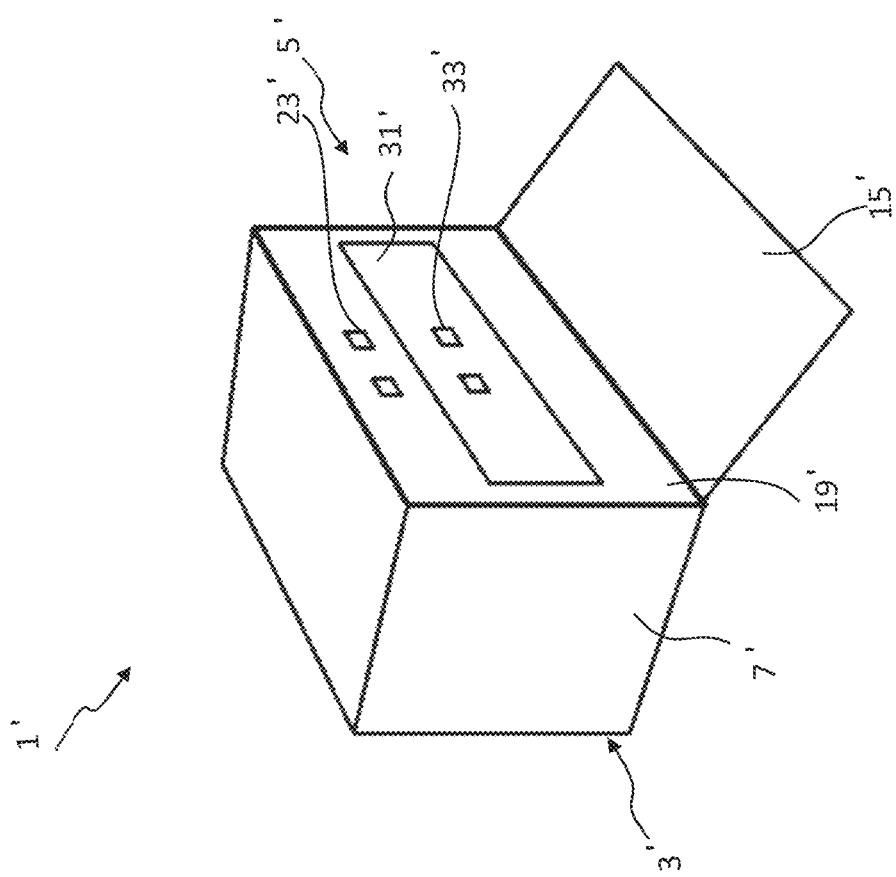
FIG. 23 shows a perspective view of the mini-oven and the cover of FIG. 21 in an assembled state, the mini-oven door being in an open state.

The flange 31' is sized to have a cross section with larger dimensions than the slot 21' such that when the sheet 29' of the food support 27' is fully inserted through the slot 21', the flange 31' is against the wall oriented towards the outside of the body 19' and seals the slot 21'. In this way, the food support 27' limits heat loss from the cooking cavity 9' by means of the slot 21', by convection and radiation. It is envisioned that a rubber gasket (not represented here) or a gasket made of another material suitable for this purpose could extend around the perimeter of the slot 21' or of the flange 31', such that when the flange 31' is against the body 19', a substantially gas tight seal is formed between the slot 21' and the flange 31' around the slot 21' to limit the passage of air between the flange 31' and the body 19' by means of the slot 21'. A side wall oriented towards the outside of the flange 31' comprises formations 33' which are substantially identical to the formations 23' of the body 19', such that the same handle 25' can conveniently be used to be connected to and disconnected from the food support 27' for safe and easy handling of the food support 27'. Beneficially, since the handle 25' can be disconnected from the food support 27', the mini-oven door 15' can be closed while the body 19' and the fully inserted food support 27' are arranged between the oven door 15' and the cooking cavity 9' as indicated in FIG. 24.

In reference to FIGS. 25 and 26, in another embodiment, the body 119' of the cover 105' comprises a pair of grooves extending respectively along lateral extremities opposite the body 119' to receive a barrier 133'. The barrier 133' comprises a metal sheet and is sized and configured to slide along the grooves in a substantially vertical plane when the cover is attached to the mini-oven 103'. The barrier 133' comprises a handle such as a button 135' to allow a user to make the barrier slide upward and downward along the grooves, at the user's choice. Otherwise, the barrier may comprise a lip (not represented here) that can be used to raise the barrier 133' when it is activated by a user. The barrier 133' may thus be moved between a first position in which the barrier 133' seals the slot 121' and a second position in which the slot 121' is open. Thus, when it is in the first position, the barrier 133' is arranged to prevent heat energy loss by convection and radiation by means of the slot 121', and when it is in the second position, the slot 121' is open for the transfer of food products between the cooking cavity 109' and the outside of the mini-oven.

In reference to FIG. 26, the optional food support 127' may be present to facilitate the transfer of food products between the cooking cavity 109' and the outside of the mini-oven 103'. However, unlike the embodiment described above, it will be seen that the food support 127' cannot be used to seal the slot 121' when the barrier 133' is arranged in the sealing position. As with the first embodiment, the cover 105' is sized and configured to rest between the cooking cavity 109' and the door 115' of the mini-oven 103' in a closed position without interfering with the normal operation of the mini-oven 103' during cooking.

In reference to FIGS. 27 and 28, in yet another embodiment, the cover 205' comprises a flap 237' which is fixed by a hinge to the body 219' of the cover 205' close to the slot 221'. The flap 237' may be moved between a first position in which the flap 237' seals the slot 221' and a second position in which the slot 221' is open. Thus, when it is in the first position, the flap 237' is arranged to prevent heat energy loss by convection and radiation by means of the slot 221', and when it is in the second position, the slot 221' is open for the transfer of food products between the cooking cavity 209' and the outside of the mini-oven. The flap 237' is biased towards the closed position by a torsion spring (not represented here). As with the food support 227', it is envisioned that a rubber gasket (not represented here) or a gasket made of another material suitable for this purpose could extend around the perimeter of the slot 221' or of the flap 237', such that when the flap 237' is against the body 219' in the closed position, a substantially gas tight seal is formed between the body 219' and the flap 237' around the opening 221' to limit the passage of air between the flap 237' and the body 219' by means of the opening 221', thus further limiting heat energy loss by convection.

In reference to FIG. 28, the flap 237' is configured to open and extend into the cooking cavity 209' when the body 219' of the cover 205' is arranged to extend across and to cover the cooking cavity 209'. Thus, the slot 221' may be opened from the outside of the mini-oven 203' by pushing the flap 237' towards the inside, towards the cooking cavity 209'. Consequently, the optional food support 237' may easily be inserted into the cooking cavity 209' using a single hand, while continuing to push the sheet 229' of the food support 227' against the flap 237' while making it pass through the slot 221'. The optional food support 227' may be present to facilitate the transfer of food products between the cooking cavity 209' and the outside of the mini-oven 203'. Since the flap 237' is biased towards the closed position, during the removal of the food support 227' from the cooking cavity 209', the flap automatically closes the slot 221' to prevent additional heat energy loss. It will be understood that the food support 227' does not need to be used to seal the slot 221' when the flap 237' is arranged in the sealing position. As with the first and second embodiments, the body 219' of the cover is sized and configured to rest between the cooking cavity 209' and the door 215' of the mini-oven 203' without interfering with the normal operation of the mini-oven 203' during cooking.

Figure 29A:
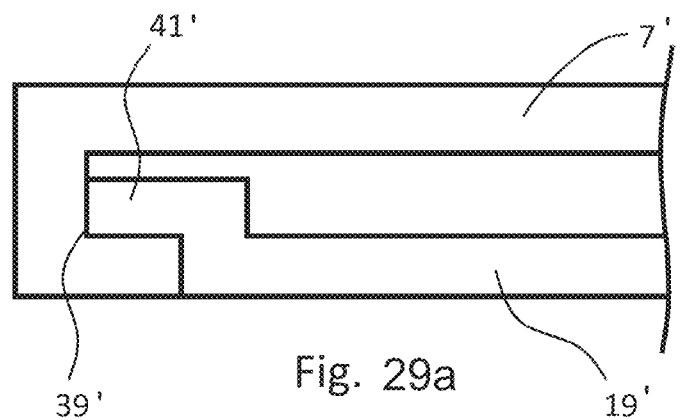
FIG. 29a is an enlarged cross-sectional view of a first system for fixing a cover according to the invention to a mini-oven.
Figure 29B:
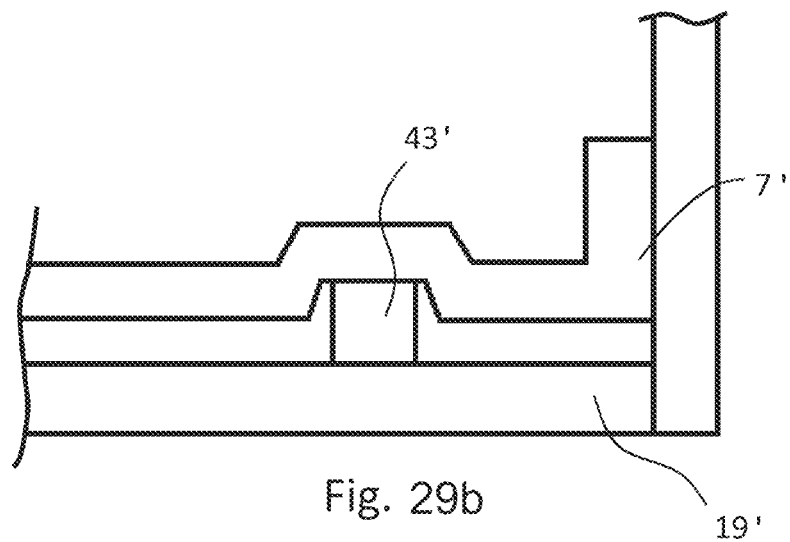
FIG. 29b is an enlarged cross-sectional view of another system for fixing a cover according to the invention to a mini-oven.
Figure 29C:
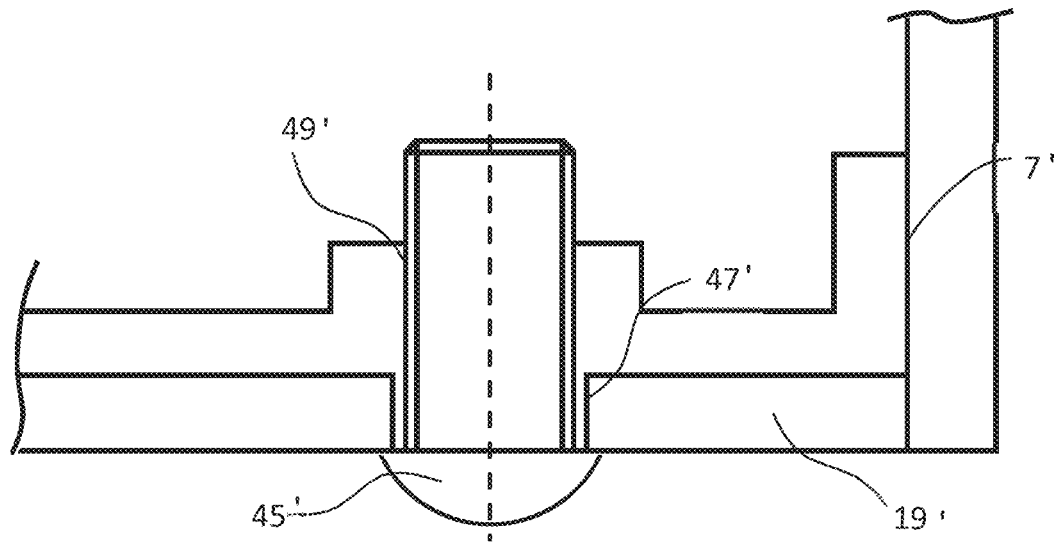
FIG. 29c is an enlarged cross-sectional view of yet another system for fixing a cover according to the invention to a mini-oven.

In reference to FIGS. 29a, 29b and 29c, different system configured to fix the body 19', 119', 219' of the cover 5', 105', 205' to the mini-oven 3', 103', 203' are envisioned. In reference to FIG. 29a, the fixing system comprises a groove 39' formed by the frame 7' of the mini-oven 3', which is configured to receive an edge 41' of the body 19' of the cover 5'. A pair of grooves 39' may be arranged on opposite sides respectively of the opening 11' of the cooking cavity 9', to allow the body 19' to slide into place, the edges 41' sliding along the grooves 39' in a substantially vertical plane. In reference to FIG. 29b, in another embodiment, the fixing system comprises a magnet 43' configured to attract the body 19', either under the effect of the magnetic properties of the material of the body, or under the effect of a magnet correspondingly positioned on the body 19'. In reference to FIG. 29c, in yet another embodiment, the fixing system comprises a screw 45' configured to extend through a hole 47' formed in the body 19' and to enter a screw hole 49' formed in the frame 7' of the mini-oven 3'. Other fixing systems suitable for this purpose may be used, as will be appreciated by the person skilled in the art.

Figure 31:
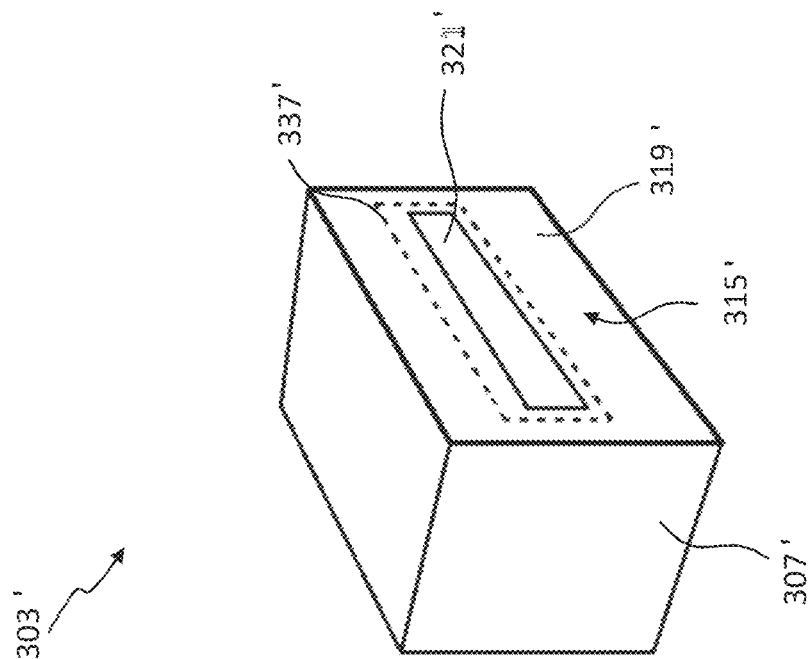
FIG. 31 is a perspective view of the mini-oven represented in FIG. 30 when the cover is in a closed state.
Figure 30:
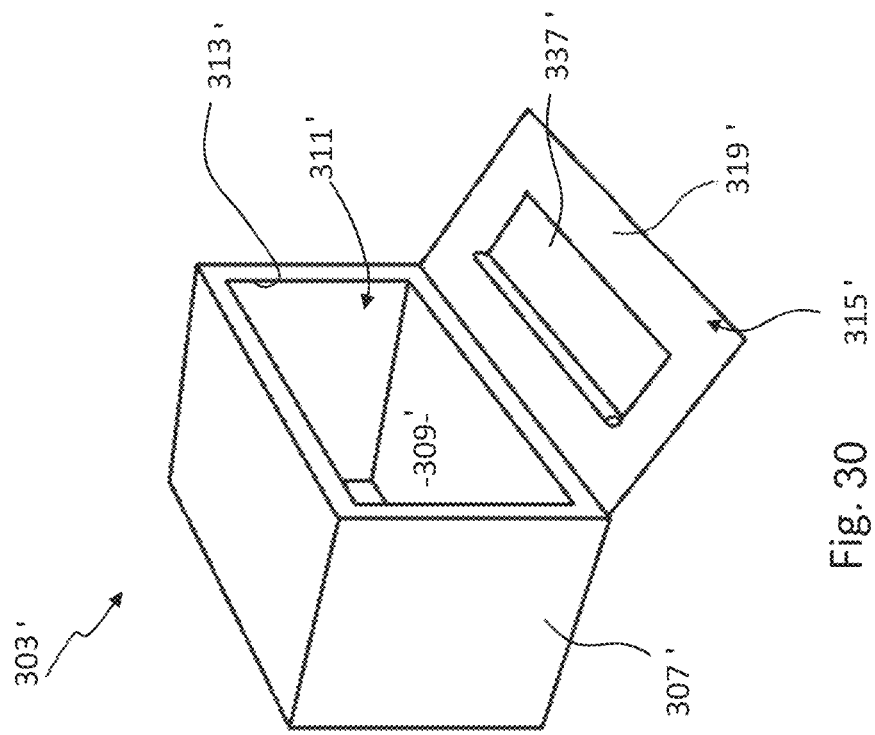
FIG. 30 is a perspective view of a mini-oven comprising a cover according to yet another embodiment of the variant of the invention, the cover being the mini-oven door and being in an open state.

In reference to FIGS. 30 to 32, according to yet another embodiment, the mini-oven door 315' can perform the function of a cover according to an embodiment of the invention. In the embodiment represented, the body 319' of the mini-oven door 315' itself comprises a slot 321' through which food products can be transferred between the cooking cavity 309' and the outside of the mini-oven, without having to open the oven door 315'. The mini-oven door 315' also comprises a flap 337' which is fixed by a hinge to the interior surface of the oven door 315' close to the slot 321'. The flap 337' may be moved between a first position in which the flap 337' seals the slot 321' and a second position in which the slot 321' is open. Thus, when it is in the first position, the flap 337' is arranged to prevent heat energy loss by convection and radiation through the slot 321', and when it is in the second position, the slot 321' is open for the transfer of food products between the cooking cavity 309' and the outside of the mini-oven. The flap 337' is biased towards the closed position by a torsion spring (not represented here).

Figure 32B:
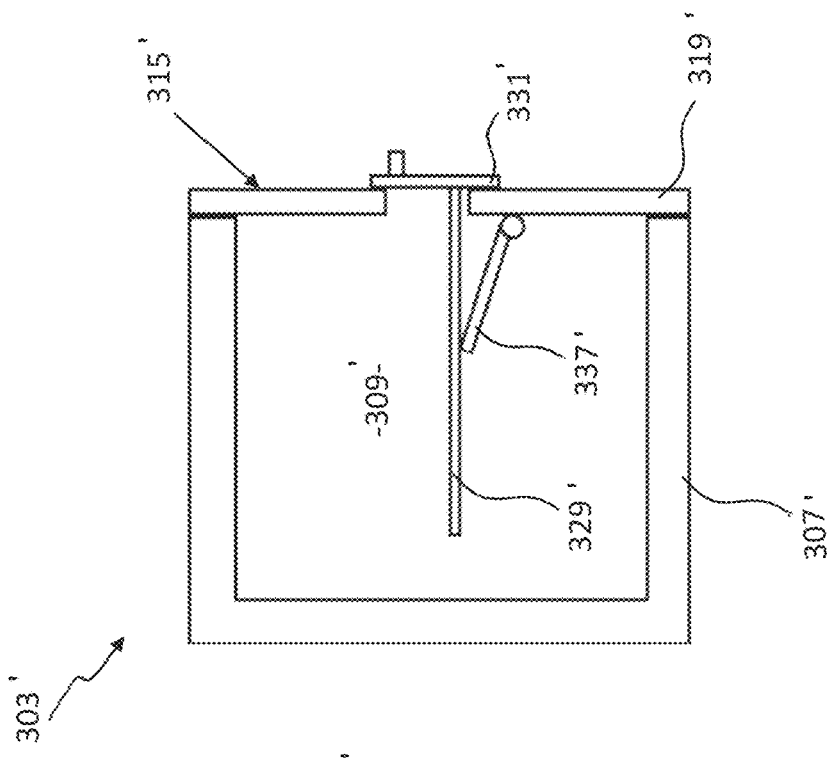
FIG. 32b is a cross-sectional view of the mini-oven represented in FIG. 32a, the additional part being entirely inserted into the mini-oven.
Figure 32A:
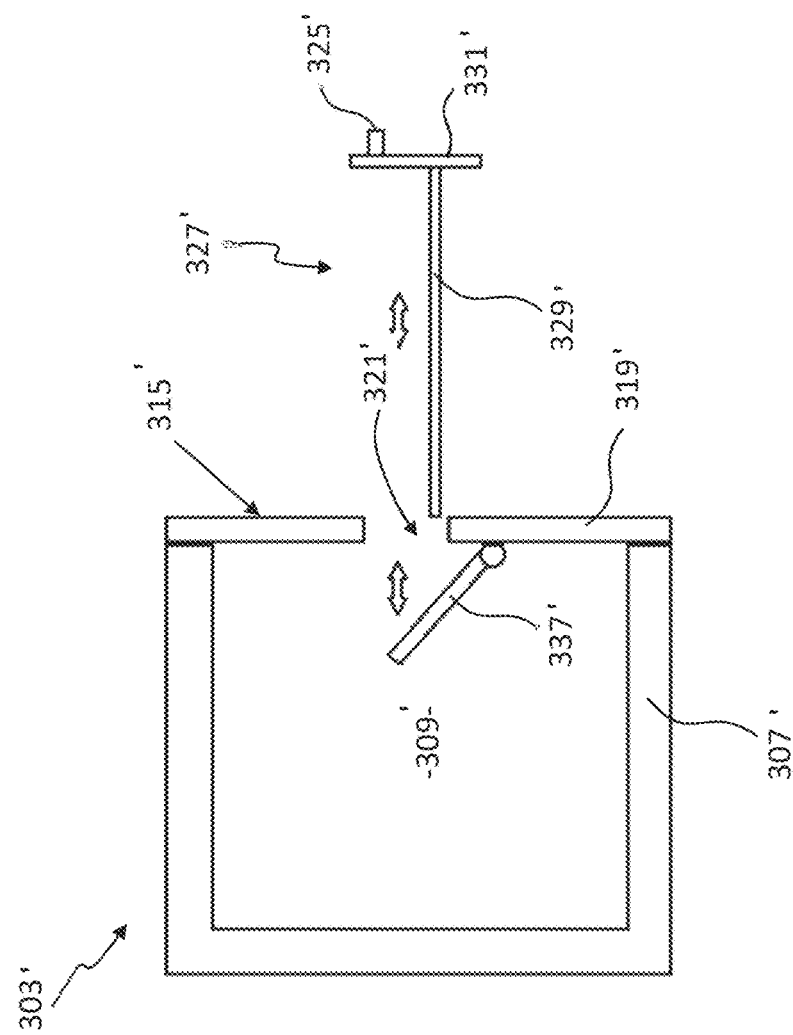
FIG. 32a is a cross-sectional view of the mini-oven represented in FIG. 31, interacting with an additional part of the cover.
Figure 33:
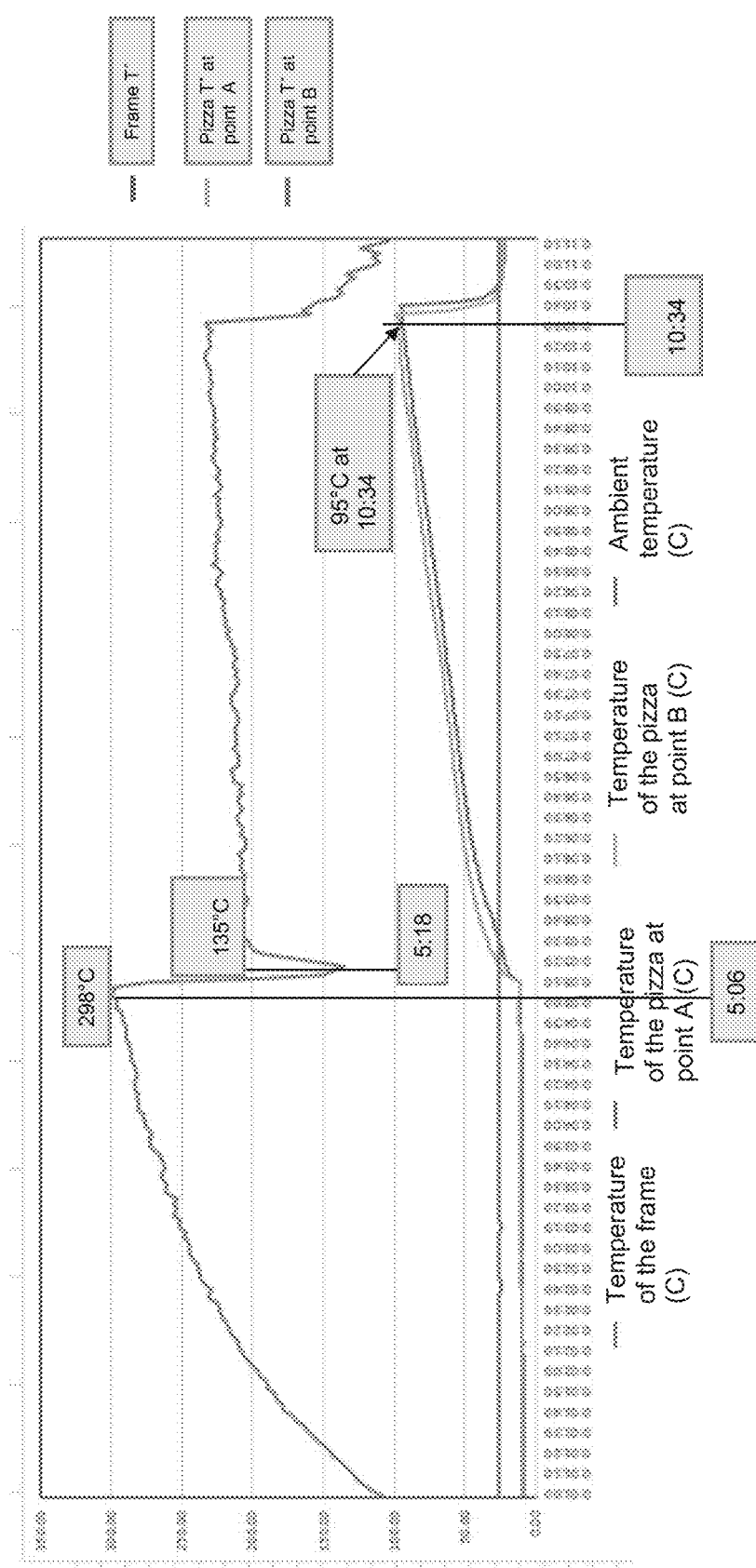
FIG. 33 is a chart of the temperature of the mini-oven frame and of the temperature of a pizza with two locations of the pizza, measured during use over time, the mini-oven door being closed and without a cover according to this invention.

In reference to FIGS. 32a and 32b, the flap 337' is configured to open and extend into the cooking cavity 309' when the door 315' is in the closed position. Therefore, the slot 321' may be opened from the outside of the mini-oven by pushing the flap 337' towards the inside, towards the cooking cavity 309'. The optional food support 327' may be present to facilitate the transfer of food products between the cooking cavity 309' and the outside of the mini-oven. Since the flap 337' is biased towards the closed position, during the removal of the food support 327' from the cooking cavity 309', the flap automatically closes the slot 321' to prevent additional heat energy loss. It will be understood that the food support 327' does not need to be used to seal the slot 321' when the flap 337' is arranged in the sealing position.

In each of the embodiments described above, the cover 5', 105', 205', may comprise one or more windows to allow visual access to the inside of the cooking cavity 9', 109', 209', 309' from outside of the mini-oven so that a user can inspect food products during cooking without having to expose the cooking cavity to the outside of the mini-oven.

When the cover 5', 105', 205' is an accessory of a mini-oven 3', 103', 203', as in the case of the first, second and third embodiments described above, and when it is desired to cook one or more food products that will pass through the slot 21', 121', 221' of the cover 5', 105', 205', the cover is fixed to the mini-oven 3', 103', 203' and arranged to extend across the opening 11', 111', 211' such that the food products can be transferred between the cooking cavity 9', 109', 209' and the outside of the mini-oven only through the slot 21', 121', 221'. When the cover is in place, the mini-oven door 15', 115', 215' is closed and the mini-oven 3', 103', 203' is set to the desired target temperature and turned on to preheat the oven. In the case of the first embodiment described, the optional food support 27' can be inserted through the slot 21' to seal the slot 21' and form an additional barrier against heat energy loss by means of the slot 21'.

Because of the presence of the cover 5', 105', 205' between the cooking cavity 9', 109', 209' and the oven door 15', 115', 215', the reduction of heat energy loss is improved such that the cooking cavity reaches the target temperature more quickly than without the cover 5', 105', 205'. The presence of the cover 5', 105', 205' has the additional effect of allowing the mini-oven to reach higher temperatures than normal.

Once the target temperature is reached, the oven door 15', 115', 215' is opened and one or more food products, such as a pizza, are inserted into the cooking cavity 9', 109', 209' directly through the slot 21', 121', 221', optionally by means of the food support 27', 127', 227'. Since the cross section of the slot 21', 121', 221' is smaller than the cross section of the opening 11', 111', 211', the cooking cavity 9', 109', 209' is less exposed to the outside of the mini-oven when the oven door 15', 115', 215' is opened, such that heat energy loss is reduced. Consequently, the target temperature in the cooking cavity 9', 109', 209' is maintained or does not substantially decrease, such that the target temperature can be restored more quickly once the oven door is closed. By reducing heat energy losses, the cooking times can be reduced.

Experiments have been conducted to compare the effects of covers according to this invention on the cooking time and temperature. In reference to FIG. 33, we see that, without a cover, the mini-oven frame has reached a temperature of 298° C. in 5 minutes 6 seconds and that, when the mini-oven door was opened for 10 seconds to allow a pizza to be inserted inside the cooking cavity, the temperature of the frame decreased to about 135° C. due to heat energy losses. We also see that a desired pizza temperature, or about 95° C., was reached in 10 minutes 34 seconds.

Figure 34:
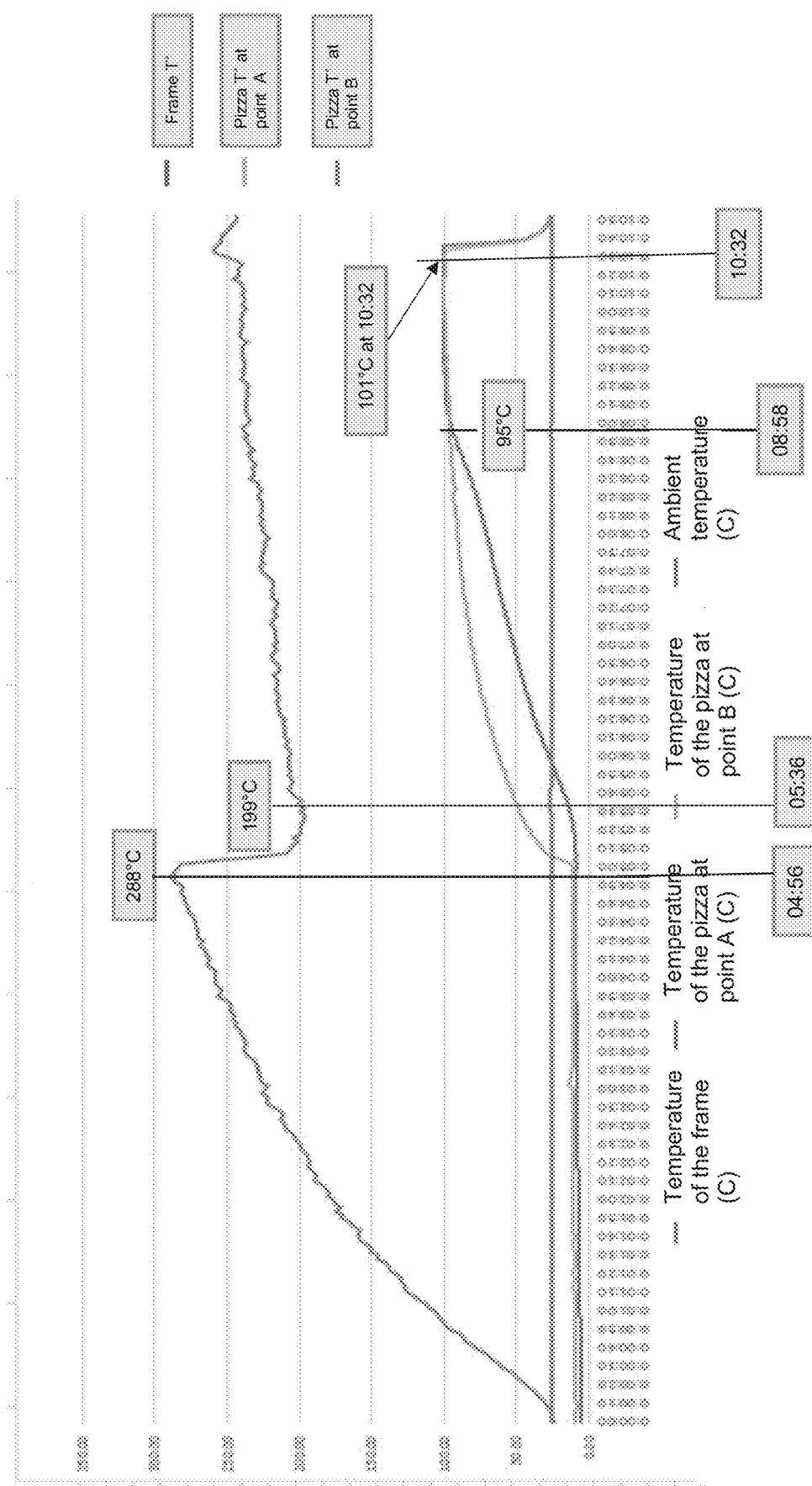
FIG. 34 is a chart of the temperature of the mini-oven frame of the mini-oven assembly represented in FIG. 17 and of the temperature of a pizza cooked by the assembly, taken at two locations of the pizza, measured over time.
Figure 35:
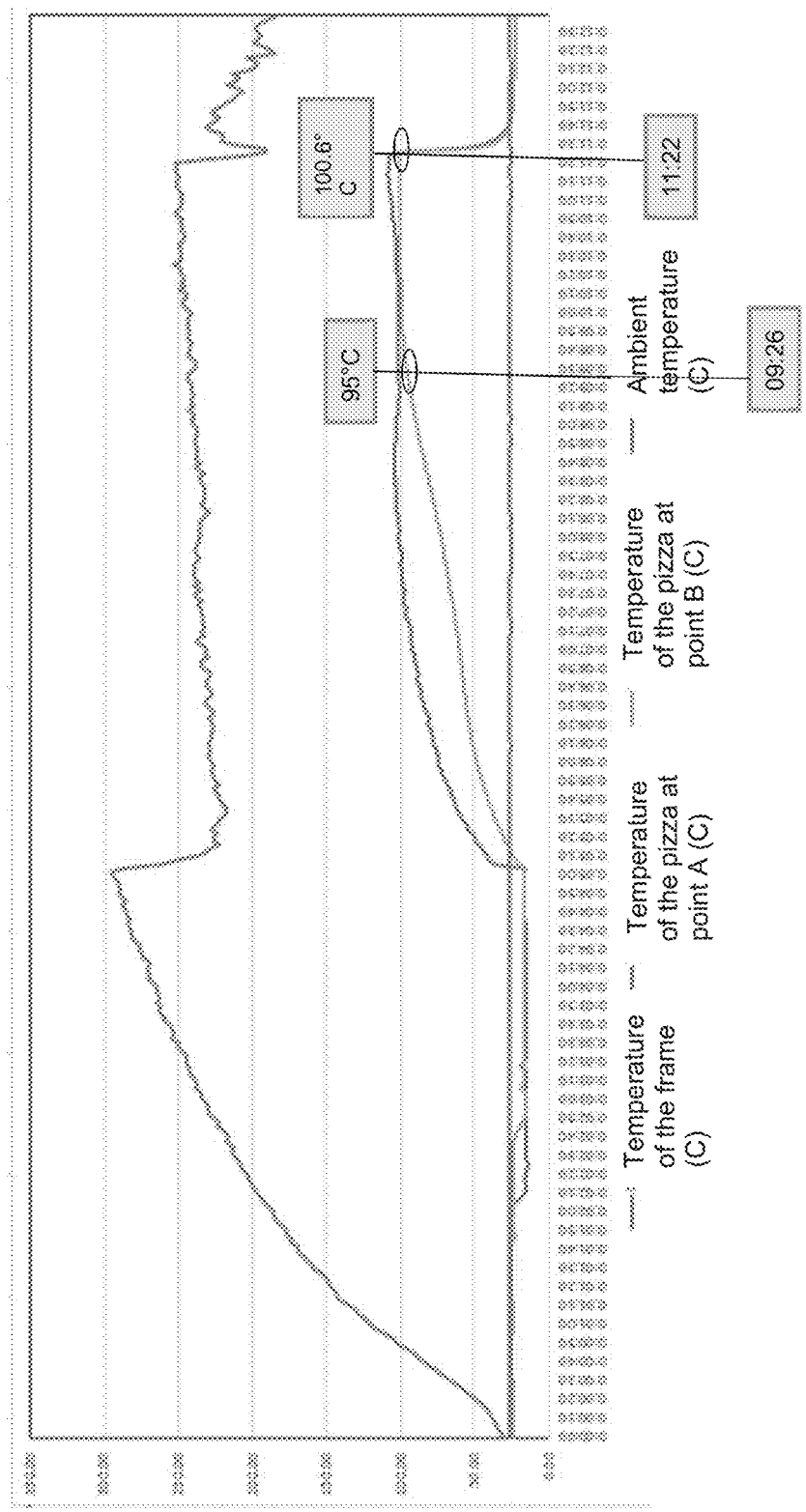
FIG. 35 is a chart of the temperature of the mini-oven frame of the mini-oven assembly represented in FIG. 21 and of the temperature of a pizza cooked by the assembly, taken at two locations of the pizza, measured over time.
Figure 36:
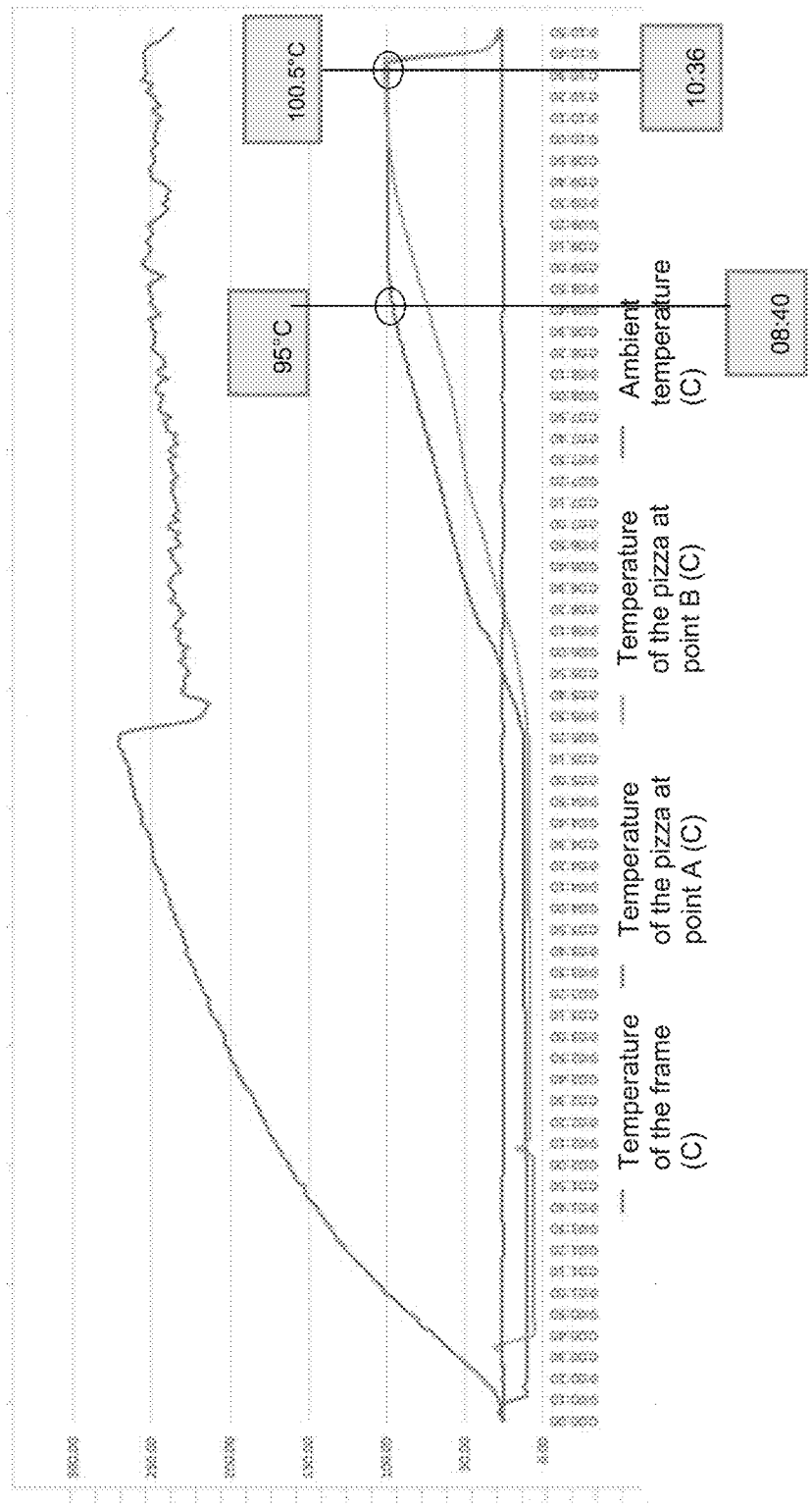
FIG. 36 is a chart of the temperature of the mini-oven frame represented in FIG. 32b and of the temperature of a pizza cooked by the assembly, taken at two locations of the pizza, measured over time.

FIGS. 34 and 35 show the results of comparative tests for a mini-oven assembly as represented in FIGS. 17 to 20 and 21 to 24, respectively. As we see in the two charts, the decrease in temperature from the target temperature on opening of the mini-oven door was less pronounced than in the case of the mini-oven without a cover.

We see in FIG. 34 that the desired pizza temperature, or about 95° C., was reached in 8 minutes 58 seconds, or 96 seconds more quickly than in the case of the mini-oven without a cover. This represents a 15% improvement in cooking time. We also see that a maximum pizza temperature of about 101° C. was eventually reached, which represents a maximum pizza temperature about 6% higher than that reached with the mini-oven without a cover.

We also see in FIG. 35 that the desired pizza temperature, or about 95° C., was reached in 9 minutes 26 seconds, or 68 seconds more quickly than in the case of the mini-oven without a cover. This represents an 11% improvement in cooking time. We also see that a maximum pizza temperature of about 100.6° C. was eventually reached, which also represents a maximum pizza temperature about 6% higher than that reached with the mini-oven without a cover.

Tests have also been conducted with the mini-oven represented in FIG. 32b, the food support 327' being entirely inserted into the mini-oven 303' by means of the slot 321'. In reference to the test results represented in FIG. 36, we see that the desired pizza temperature, or about 95° C., was reached in 8 minutes 40 seconds, or 114 seconds more quickly than in the case of the mini-oven without a cover according to this invention, for which the test results are presented in FIG. 33. This represents an 18% improvement in cooking time. We also see that a maximum pizza temperature of about 100.5° C. was eventually reached, which also represents a maximum pizza temperature about 6% higher than that reached with the mini-oven without a cover according to this invention.

The test results indicate that a mini-oven assembly comprising a cover according to the invention yields substantially improved cooking times and temperatures, which are in addition to improved performances.

Therefore, it would be possible to make the following claims for this variant of the invention:

1) Cover (5', 105', 205', 315') for an opening (11', 111', 211', 311') of a cooking cavity (9', 109', 209', 309') of a mini-oven (3', 103', 203', 303'), the cover (5', 105', 205', 315') comprising a body (19', 119', 219', 319') and a slot (21', 121', 221', 321') formed through the body (19', 119', 219', 319'), the body (19', 119', 219', 319') being sized and shaped to cover the opening (11', 111', 211', 311') and being able to be arranged relative to the cooking cavity (9', 109', 209', 309') such that foods can be transferred between the cooking cavity (9', 109', 209', 309') and the outside of the mini-oven by means of the slot (21', 121', 221', 321'), and the slot (21', 121', 221', 321') being sized and configured such that, when the cover (5', 105', 205', 315') is arranged relative to the cooking cavity (9', 109', 209', 309') such that foods can be transferred between the cooking cavity (9', 109', 209', 309') and the outside of the oven by means of the slot (21', 121', 221', 321'), the cooking cavity is less exposed to the outside of the mini-oven by means of the slot (21', 121', 221', 321') than by means of the opening (11', 111', 211', 311') without the cover (5', 105', 205', 315').

2) Cover according to claim 1, also comprising one or more sealing members (27', 127', 133', 227', 237', 327', 337') for sealing the slot (21', 121', 221', 321'), one or more sealing members (27', 133', 237', 337') being able to be moved between a first position in which the slot (21', 121', 221', 321') is open and a second position in which the slot (21', 121', 221', 321') is closed.

3) Cover according to claim 2, in which one or more sealing members (237', 337') are fixed to the body by a hinge.

4) Cover according to claim 2, in which one or more sealing members (27', 127', 133', 227', 327') are slidably attached to the body such that one or more sealing members (27', 127', 133', 227', 327') can slide relative to the body (19', 119', 219', 319') between the first position and the second position.

5) Cover according to one of claims 2 to 4, in which one or more sealing members (237', 337') are biased towards the second position.

6) Cover according to one of claims 2 to 5, in which one or more sealing members (27', 127', 227', 237') are configured to extend inside the cooking cavity (9', 109', 209', 309') of the mini-oven (3', 103', 203', 303') in the first position when the cover (5', 105', 205', 315') is arranged to cover the opening (11', 111', 211', 311').

7) Cover according to any one of claims 2 to 6, in which one or more sealing members (27', 127', 227', 237') comprise a food support (29', 129', 229', 329') configured to hold one or more food products and a flange (31', 131', 231', 331') extending from the food support (29', 129', 229', 329'), at least one portion of the food support (29', 129', 229', 329') being sized and shaped for insertion through the slot (21', 121', 221', 321') and the flange (31', 131', 231', 331') being sized and shaped to cover the slot (21', 121', 221', 321') when at least a portion of the food support (29', 129', 229', 329') is inserted through the slot (21', 121', 221', 321') and the flange (31', 131', 231', 331') is against the body (19', 119', 219', 319').

8) Cover according to any one of claims 2 to 7, also comprising a gasket between one or more sealing members (27', 127', 133', 227', 237', 327', 337') and the body (19', 119', 219', 319') to prevent the passage of air between the body (19', 119', 219', 319') and the sealing members (27', 127', 133', 227', 237', 327', 337') when the sealing members (27', 127', 133', 227', 237', 327', 337') are in the second position.

9) Cover according to any one of the preceding claims, also comprising a removable handle (25', 125', 225', 325') that can be connected to the body (19', 119', 219') and/or to the sealing members (27', 127', 227', 327') to allow the cover (5', 105', 205') and/or the sealing members (27', 127', 227', 327') to be maneuvered by means of the handle (25', 125', 225', 325').

10) Cover according to one of the preceding claims, in which the cross-sectional area of the slot (21', 121', 221', 321') is smaller than the cross-sectional area of the opening (11', 111', 211', 311').

11) Cover according to any one of the preceding claims, in which the slot (21', 121', 221', 321') is sized and shaped to allow a rack (17') of the mini-oven (3', 103', 203', 303') to move between the cooking cavity (9', 109', 209', 309') and the outside of the mini-oven by means of the slot (21', 121', 221', 321').

12) Cover according to claim 11, in which the slot (21', 121', 221', 321') is positioned and oriented in the body (19', 119', 219', 319') such that, when the cover (5', 105', 205', 315') is arranged to cover the opening (11', 111', 211', 311'), one or more members intended to receive a rack of the mini-oven (3', 103', 203', 303') are aligned with the slot (21', 121', 221', 321') such that a rack (17') can be inserted into a member intended to receive a rack from the outside of the mini-oven by means of the slot (21', 121', 221', 321').

13) Cover according to any one of the preceding claims, in which the cover (5', 105', 205') is sized and shaped to rest, during use, between the cooking cavity (9', 109', 209', 309') and a door (15', 115', 215') of the mini-oven (3', 103', 203') when the door (15', 115', 215') is in the closed position.

14) Mini-oven assembly (1') comprising a mini-oven (3', 103', 203') and a cover (5', 105', 205') according to any one of the preceding claims.

15) Mini-oven (303') comprising a cover (315') according to any one of claims 1 to 12, in which the cover (315') is a door (315') of the mini-oven (303').

The above embodiments are described as examples only. Many variants are possible without departing from the scope of the invention as described in the attached claims.

The invention claimed is:

1. A mini-oven comprising:
a cooking cavity accessible from an outside of the mini oven through an opening;
a door of the cooking cavity constructed and arranged to move between a first position, in which it is possible to access the cooking cavity from the outside of the mini-oven through the opening, and a second position, in which the door restricts access to the cooking cavity from the outside of the mini-oven through the opening,
one or more connectors in a form of projections extending from a front face of the mini-oven, and each of the projections comprises a cylindrical body and a circular projection head with a diameter greater than a diameter of the cylindrical body formed at a terminal end of each cylindrical body;
a covering member configured for reducing a quantity of heat energy lost from the cooking cavity when the door to the cooking cavity is open, the covering member having complementary connectors, wherein the complementary connectors comprise a keyhole-shaped opening arranged to receive the projections of the one or more connectors;
wherein
the covering member is removably attached to the mini-oven and configured as a planar body with a surface extending at least partially across the opening of the cooking cavity when the covering member is connected to the mini-oven and when the door is in the second position, the planar body extending in a plane extending across the cooking cavity,
the covering member is sized and arranged to be able to be slidably connected to the mini-oven and to form at least a portion of the door when the covering member is connected to the mini-oven, or the covering member is sized and arranged such that at least a portion of the covering member is placeable between the cooking cavity and the door when the door is in the second position, the covering member is also sized and arranged so as to limit access to the cooking cavity through the opening when the covering member is connected to the mini-oven while allowing at least partial access to the cooking cavity, when the door is in the first position, and the covering member comprises a handle allowing the covering member to be gripped and manipulated, the handle comprising a thermal insulation material.

2. The mini-oven according to claim 1, wherein the one or more connectors are positioned for connecting the covering member to the mini-oven such that, during connection to the mini-oven, the covering member extends across an upper region of the opening.

3. The mini-oven according to claim 1, wherein the one or more connectors are positioned for connecting the covering member to an upper part of the mini-oven.

4. The covering member according to claim 1, wherein the keyhole-shaped openings are positioned on the covering member so as to allow a part of the covering member to extend across the opening when the covering member is connected to the mini-oven and the door is in the second position.

5. The covering member according to claim 1, wherein said at least one portion of the covering member comprises a sheet of material.

6. The covering member according to claim 5, wherein the sheet of material is thin enough to be lodged between the door and the cooking cavity when the door is in the second position.

7. The covering member according to claim 1, wherein at least a portion of the handle is positioned such that, when the covering member is connected to the mini-oven and arranged between the cooking cavity and the door, when the door is in the second position, at least a portion of the handle is outside of the mini-oven.

8. The covering member according to claim 1, wherein dimensions or form of the covering member are adjustable.

\* \* \* \* \*